United States Patent
Liu et al.

(10) Patent No.: US 12,520,283 B2
(45) Date of Patent: Jan. 6, 2026

(54) RESOURCE CONFIGURATION METHOD, COMMUNICATION METHOD, AND APPARATUS

(71) Applicant: Huawei Technologies Co., Ltd., Shenzhen (CN)

(72) Inventors: Hang Liu, Beijing (CN); Sha Ma, Beijing (CN); Changqing Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

(21) Appl. No.: 17/954,670

(22) Filed: Sep. 28, 2022

(65) Prior Publication Data
US 2023/0017780 A1 Jan. 19, 2023

Related U.S. Application Data

(63) Continuation of application No. PCT/CN2020/082344, filed on Mar. 31, 2020.

(51) Int. Cl.
- *H04W 4/80* (2018.01)
- *H04L 1/00* (2006.01)
- *H04L 5/00* (2006.01)
- *H04W 72/044* (2023.01)
- *H04W 72/40* (2023.01)
- *H04W 72/56* (2023.01)

(52) U.S. Cl.
CPC ......... *H04W 72/044* (2013.01); *H04L 1/0003* (2013.01); *H04L 5/0016* (2013.01); *H04L 5/0053* (2013.01); *H04W 72/56* (2023.01)

(58) Field of Classification Search
CPC ..... H04W 72/044; H04W 72/56; H04W 4/48; H04W 4/80; H04W 72/40; H04L 1/003
See application file for complete search history.

(56) References Cited

U.S. PATENT DOCUMENTS

| 10,306,599 | B2* | 5/2019 | Agiwal | H04W 40/22 |
| 11,700,603 | B2* | 7/2023 | Li | H04W 72/1263 370/329 |

(Continued)

FOREIGN PATENT DOCUMENTS

| CN | 104703224 | * | 4/2015 | H04W 28/14 |
| CN | 104703224 A | | 6/2015 | |

(Continued)

OTHER PUBLICATIONS

3GPP TSG RAN WG1#79, R1-144729 Title:Rmaining Power Control Aspects for Dual Connectivity (Year: 2014).*

*Primary Examiner* — Faruk Hamza
*Assistant Examiner* — Abusayeed M Haque
(74) *Attorney, Agent, or Firm* — Conley Rose, P.C.

(57) ABSTRACT

A resource configuration method for a short-range communications field includes obtaining at least one resource parameter; determining a first time-frequency resource based on the at least one resource parameter; and sending at least one piece of resource configuration information to at least one second terminal device. The at least one piece of resource configuration information is used to configure at least one second time-frequency resource used for the at least one second terminal device, and the at least one second time-frequency resource belongs to the first time-frequency resource.

20 Claims, 3 Drawing Sheets

---

Receive first resource configuration information sent by a second terminal device — S201

Obtain second resource configuration information corresponding to a first resource pool — S202

Initiate a connection setup request to the second terminal device based on the first resource configuration information and the second resource configuration information, or disconnect a connection to the second terminal device based on the first resource configuration information and the second resource configuration information — S203

(56) References Cited

U.S. PATENT DOCUMENTS

| | | | | |
|---|---|---|---|---|
| 2017/0230941 A1* | 8/2017 | Agiwal | ................ | H04W 72/51 |
| 2018/0213379 A1* | 7/2018 | Xiong | .................... | H04W 4/70 |
| 2018/0317276 A1* | 11/2018 | Lei | ....................... | H04W 76/30 |
| 2019/0239112 A1 | 8/2019 | Rao et al. | | |
| 2019/0268920 A1* | 8/2019 | Falahati | ............ | H04W 72/0446 |
| 2019/0306846 A1* | 10/2019 | Luo | ...................... | H04W 72/23 |

FOREIGN PATENT DOCUMENTS

| | | |
|---|---|---|
| CN | 104869526 A | 8/2015 |
| CN | 105517191 A | 4/2016 |
| CN | 108696935 A | 10/2018 |
| WO | 2009048204 A1 | 4/2009 |
| WO | 2016161709 A1 | 10/2016 |
| WO | 2019240544 A1 | 12/2019 |
| WO | 2020015693 A1 | 1/2020 |
| WO | 2020050601 A1 | 3/2020 |

\* cited by examiner

RESOURCE CONFIGURATION METHOD, COMMUNICATION METHOD, AND APPARATUS

CROSS-REFERENCE TO RELATED APPLICATIONS

This application is a continuation application of International Patent Application No. PCT/CN2020/082344, filed on Mar. 31, 2020, which is hereby incorporated by reference in its entirety.

TECHNICAL FIELD

This application relates to the communications field, and in particular, to short-range communications, for example, short-range communications in the autonomous driving field and the intelligent cockpit field. This application relates to a resource configuration method, a communication method, and an apparatus.

BACKGROUND

Currently, in short-range communications in the communications field, terminal devices may communicate with each other in a wired communication manner, or may communicate with each other in a wireless communication manner.

For example, in short-range communications in the autonomous driving field and the intelligent cockpit field, terminal devices participating in the short-range communications in an intelligent cockpit may include a cockpit domain controller (CDC), where the cockpit domain controller may be referred to as a head unit for short, an in-vehicle audio and video device (for example, a speaker, a microphone, or a screen), an intelligent terminal (for example, a mobile phone), another intelligent wearable device (for example, a headset), and the like. Communication is performed in a wireless communication manner (for example, through Bluetooth) between the head unit and the intelligent terminal and between the intelligent terminal and the intelligent wearable device, and communication is usually performed in a wired communication manner between the head unit and the in-vehicle audio and video device.

In the terminal devices participating in the short-range communications, when a quantity of terminal devices performing communication in a wired communication manner increases, a quantity of cables increases. This causes difficulty in cabling. For example, when a quantity of in-vehicle audio and video devices in the intelligent cockpit increases, a quantity of cables between the head unit and the in-vehicle audio and video devices increases. This causes difficulty in cabling in a vehicle.

If all terminal devices participating in the short-range communications communicate with each other in a wireless communication manner, the difficulty in cabling can be resolved. However, if all the terminal devices participating in the short-range communications communicate with each other in the wireless communication manner, how to perform resource configuration to ensure efficient communication between the terminal devices participating in the short-range communications becomes a technical problem to be urgently resolved by persons skilled in the art.

SUMMARY

This application provides a resource configuration method, a communication method, and an apparatus, to resolve a problem of how to perform resource configuration in a wireless communication mode to ensure efficient communication between terminal devices participating in short-range communications.

According to a first aspect, this application provides a resource configuration method. The method includes: obtaining at least one resource parameter; determining a first time-frequency resource based on the at least one resource parameter; and sending at least one piece of resource configuration information to at least one second terminal device. The at least one piece of resource configuration information is used to configure at least one second time-frequency resource used for the at least one second terminal device, and the at least one second time-frequency resource belongs to the first time-frequency resource.

In this implementation, the first terminal device may obtain the at least one resource parameter; then determine the first time-frequency resource based on the at least one resource parameter; and further send the at least one piece of resource configuration information to the at least one second terminal device. The at least one piece of resource configuration information may be used to configure the at least one second time-frequency resource that may be used for the at least one second terminal device, and the at least one second time-frequency resource belongs to the first time-frequency resource. It can be learned that the method is applied to short-range communications, for example, short-range communications in the autonomous driving field and the intelligent cockpit field. In terminal devices participating in the short-range communications, a terminal device having a resource allocation capability may obtain a time-frequency resource based on a resource parameter obtained by the terminal device, and allocate the time-frequency resource obtained by the terminal device to a terminal device connected to the terminal device. This ensures efficient communication between the terminal devices participating in the short-range communications.

With reference to the first aspect, in a first possible implementation of the first aspect, the at least one resource parameter is preconfigured.

In this implementation, at least one resource parameter is preconfigured for each terminal device, so that the first terminal device can quickly obtain the at least one resource parameter required by the first terminal device.

With reference to the first aspect, in a second possible implementation of the first aspect, the at least one resource parameter corresponds to capability information of the first terminal device, and/or the at least one resource parameter corresponds to a device type of the first terminal device.

In this implementation, the device type and/or the capability information of the first terminal device corresponds to the at least one resource parameter obtained by the first terminal device. In this way, a correspondence between the resource parameter and the device type and/or the capability information of the terminal device may be preconfigured or predefined, a resource parameter does not need to be preconfigured for each terminal device, so that applicability is better, and different resource parameters may be configured based on different device types and/or capability information, so that differentiated management is performed on time-frequency resources obtained by terminal devices having different device types and/or capability information. This improves proper and efficient utilization of the time-frequency resources.

With reference to the first aspect, in a third possible implementation of the first aspect, the obtaining at least one resource parameter includes: obtaining the at least one resource parameter from a first resource parameter set. The first resource parameter set includes a plurality of resource parameters corresponding to a plurality of pieces of capability information and/or a plurality of device types.

In this implementation, the first terminal device may obtain the at least one resource parameter from the first resource parameter set based on the device type and/or the capability information of the first terminal device. The resource parameter obtaining manner is more flexible.

With reference to the first aspect, in a fourth possible implementation of the first aspect, the capability information of the first terminal device includes at least one of the following: identity information of the first terminal device, where the identity information indicates that the first terminal device has a resource allocation or scheduling capability; type information of a communication domain of the first terminal device; and priority information of the communication domain of the first terminal device, where the priority information of the communication domain indicates a priority of the communication domain of the first terminal device.

In this implementation, more applicable capability information may be selected according to a requirement of an actual application scenario, so that settings of the capability information are more flexible, and applicability is better.

With reference to the first aspect, in a fifth possible implementation of the first aspect, the at least one resource parameter includes at least one of the following: channel occupancy ratio information, modulation and coding scheme information, resource cycle information, and resource duration information.

In this implementation, a more applicable resource parameter may be selected according to a requirement of an actual application scenario, so that settings of the resource parameter are more flexible, and applicability is better.

With reference to the first aspect, in a sixth possible implementation of the first aspect, the method further includes: sending first resource indication information, and/or at least one of the capability information of the first terminal device and information about the device type of the first terminal device, where the first resource indication information indicates the first time-frequency resource.

In this implementation, the first terminal device may send, to another terminal device, the first resource indication information indicating the first time-frequency resource, and/or the at least one of the capability information and the device type information of the first terminal device. In this way, the other terminal device may be notified of information about the time-frequency resource obtained by the first terminal device, to avoid a communication conflict between the other terminal device and the first terminal device.

According to a second aspect, this application provides a communication method. The method includes: receiving first resource configuration information from a second terminal device; obtaining second resource configuration information corresponding to a first resource pool; and initiating a connection setup request to the second terminal device based on the first resource configuration information and the second resource configuration information, or disconnecting a connection to the second terminal device based on the first resource configuration information and the second resource configuration information.

In this implementation, a first terminal device may receive the first resource configuration information sent by the second terminal device, obtain the second resource configuration information corresponding to the first resource pool, and initiate the connection setup request to the second terminal device based on the first resource configuration information and the second resource configuration information, or disconnect the connection to the second terminal device based on the first resource configuration information and the second resource configuration information. Based on this, the method is applied to short-range communications. Each terminal device participating in the short-range communications may compare different resource configuration information, and choose whether to be scheduled or allocated a resource by another terminal device having a resource allocation capability, to obtain better or more time-frequency resources, so as to better meet a communication requirement of the terminal device or improve communication performance of the terminal device.

With reference to the second aspect, in a first possible implementation of the second aspect, the first resource configuration information includes at least one of first channel busy ratio information, first modulation and coding scheme information, and first resource quantity information; and the second resource configuration information includes at least one of second channel busy ratio information, second modulation and coding scheme information, and second resource quantity information.

In this implementation, more applicable first resource configuration information and second resource configuration information may be selected according to a requirement of an actual application scenario, so that settings of the first resource configuration information and second resource configuration information are more flexible, and applicability is better.

With reference to the second aspect, in a second possible implementation of the second aspect, the disconnecting a connection to the second terminal device based on the first resource configuration information and the second resource configuration information includes: when a first channel load ratio indicated by the first channel busy ratio information is greater than or greater than or equal to a second channel load ratio indicated by the second channel busy ratio information; or when a difference between a first channel load ratio indicated by the first channel busy ratio information and a second channel load ratio indicated by the second channel busy ratio information is greater than or greater than or equal to a first threshold, disconnecting the connection to the second terminal device.

In this implementation, when it is determined, by comparing channel load ratios, that better or more time-frequency resources can be obtained from the first resource pool, the connection to the second terminal device is disconnected, to obtain better or more time-frequency resources.

With reference to the second aspect, in a third possible implementation of the second aspect, the disconnecting a connection to the second terminal device based on the first resource configuration information and the second resource configuration information includes: when a resource quantity indicated by the first resource quantity information is less than or less than or equal to a resource quantity indicated by the second resource quantity information, disconnecting the connection to the second terminal device.

In this implementation, when it is determined, by comparing resource quantities, that better or more time-frequency resources can be obtained from the first resource pool, the connection to the second terminal device is disconnected, to obtain better or more time-frequency resources.

With reference to the second aspect, in a fourth possible implementation of the second aspect, the disconnecting a connection to the second terminal device based on the first resource configuration information and the second resource configuration information includes: when a first modulation and coding scheme indicated by the first modulation and coding scheme information is less than a second modulation and coding scheme indicated by the second modulation and coding scheme information; or when a distance between a second modulation and coding scheme indicated by the second modulation and coding scheme information and a first modulation and coding scheme indicated by the first modulation and coding scheme information is greater than or greater than or equal to a second threshold, disconnecting the connection to the second terminal device.

In this implementation, when it is determined, by comparing modulation and coding schemes, that better or more time-frequency resources can be obtained from the first resource pool, the connection to the second terminal device is disconnected, to obtain better or more time-frequency resources.

With reference to the second aspect, in a fifth possible implementation of the second aspect, the initiating a connection setup request to the second terminal device based on the first resource configuration information and the second resource configuration information includes: when a first channel load ratio indicated by the first channel busy ratio information is less than a second channel load ratio indicated by the second channel busy ratio information; or when a difference between a second channel load ratio indicated by the second channel busy ratio information and a first channel load ratio indicated by the first channel busy ratio information is greater than or greater than or equal to a third threshold, initiating the connection setup request to the second terminal device.

In this implementation, the connection setup request may be initiated to the second terminal device by comparing channel load ratios, and resource scheduling or allocation of the second terminal device may be accepted, to obtain better or more time-frequency resources, so as to better meet a communication requirement of the first terminal device or improve communication performance of the first terminal device.

With reference to the second aspect, in a sixth possible implementation of the second aspect, the initiating a connection setup request to the second terminal device based on the first resource configuration information and the second resource configuration information includes: when a resource quantity indicated by the first resource quantity information is greater than a resource quantity indicated by the second resource quantity information, initiating the connection setup request to the second terminal device.

In this implementation, the connection setup request is initiated to the second terminal device by comparing resource quantities, and resource scheduling or allocation of the second terminal device is accepted, to obtain better or more time-frequency resources, so as to better meet a communication requirement of the first terminal device or improve communication performance of the first terminal device.

With reference to the second aspect, in a seventh possible implementation of the second aspect, the initiating a connection setup request to the second terminal device based on the first resource configuration information and the second resource configuration information includes: when a first modulation and coding scheme indicated by the first modulation and coding scheme information is greater than or greater than or equal to a second modulation and coding scheme indicated by the second modulation and coding scheme information; or when a distance between a first modulation and coding scheme indicated by the first modulation and coding scheme information and a second modulation and coding scheme indicated by the second modulation and coding scheme information is greater than or greater than or equal to a fourth threshold, initiating the connection setup request to the second terminal device.

In this implementation, the connection setup request may be initiated to the second terminal device by comparing modulation and coding schemes, and resource scheduling or allocation of the second terminal device may be accepted, to obtain better or more time-frequency resources, so as to better meet a communication requirement of the first terminal device or improve communication performance of the first terminal device.

With reference to the second aspect, in an eighth possible implementation of the second aspect, the second resource configuration information corresponding to the first resource pool is preconfigured.

In this implementation, the second resource configuration information corresponding to the first resource pool is preconfigured, and can be obtained more easily and quickly during use.

With reference to the second aspect, in a ninth possible implementation of the second aspect, the obtaining second resource configuration information corresponding to a first resource pool includes: obtaining the second resource configuration information that corresponds to the first resource pool and that is configured by the second terminal device by using signaling.

In this implementation, the second resource configuration information corresponding to the first resource pool may be obtained from signaling sent by the second terminal device, so that the second resource configuration information can be obtained more flexibly.

With reference to the second aspect, in a tenth possible implementation of the second aspect, the first resource configuration information corresponds to a second resource pool; or the first resource configuration information is included in a first semi-persistent scheduling message.

In this implementation, when the first resource configuration information is obtained, information about the second resource pool may be further obtained. The second resource pool is a resource pool used by the second terminal device to schedule a time-frequency resource for another terminal device connected to the second terminal device, so that reference information for adjusting a status of the connection to the second terminal device is richer, and applicability is better.

According to a third aspect, this application provides a communication method. The method includes: receiving first resource configuration information from a second terminal device; obtaining second resource configuration information corresponding to a first resource pool, where the first resource pool is allowed to be shared by at least one first terminal device; and initiating a connection setup request to the second terminal device based on the first resource configuration information and the second resource configuration information, or disconnecting a connection to the second terminal device based on the first resource configuration information and the second resource configuration information.

In this implementation, the first terminal device may receive the first resource configuration information sent by the second terminal device, obtain the second resource configuration information corresponding to the first resource pool, and initiate the connection setup request to the second terminal device based on the first resource configuration information and the second resource configuration information, or disconnect the connection to the second terminal device based on the first resource configuration information and the second resource configuration information. Based on this, the method is applied to short-range communications. Each terminal device participating in the short-range communications may compare different resource configuration information, and choose whether to be scheduled or allocated a resource by another terminal device having a resource allocation capability, to obtain better or more time-frequency resources, so as to better meet a communication requirement of the terminal device or improve communication performance of the terminal device.

According to a fourth aspect, this application provides a resource configuration apparatus. The apparatus includes a processing module and a sending module. The processing module is configured to obtain at least one resource parameter; and determine a first time-frequency resource based on the at least one resource parameter. The sending module is configured to send at least one piece of resource configuration information to at least one second terminal device. The at least one piece of resource configuration information is used to configure at least one second time-frequency resource used for the at least one second terminal device, and the at least one second time-frequency resource belongs to the first time-frequency resource.

The apparatus in this implementation may obtain the at least one resource parameter; then determine the first time-frequency resource based on the at least one resource parameter; and further send the at least one piece of resource configuration information to the at least one second terminal device. The at least one piece of resource configuration information may be used to configure the at least one second time-frequency resource that may be used for the at least one second terminal device, and the at least one second time-frequency resource belongs to the first time-frequency resource. It can be learned that the apparatus is applied to short-range communications, for example, short-range communications in the autonomous driving field and the intelligent cockpit field. In terminal devices participating in the short-range communications, a terminal device having a resource allocation capability may obtain a time-frequency resource based on a resource parameter obtained by the terminal device, and allocate the time-frequency resource obtained by the terminal device to a terminal device connected to the terminal device. This ensures efficient communication between the terminal devices participating in the short-range communications.

With reference to the fourth aspect, in a first possible implementation of the fourth aspect, the at least one resource parameter is preconfigured.

The apparatus in this implementation may preconfigure at least one resource parameter in a system of the apparatus, to quickly obtain the at least one resource parameter required by the apparatus during use.

With reference to the fourth aspect, in a second possible implementation of the fourth aspect, the at least one resource parameter corresponds to capability information of the first terminal device, and/or the at least one resource parameter corresponds to a device type of the first terminal device.

In the apparatus in this implementation, the at least one resource parameter corresponds to the device type and/or the capability information of the first terminal device. In this way, different resource parameters may be configured based on different device types and/or capability information, so that differentiated management is performed on time-frequency resources obtained by terminal devices having different device types and/or capability information. This improves proper and efficient utilization of the time-frequency resources.

With reference to the fourth aspect, in a third possible implementation of the fourth aspect, the processing module is configured to obtain the at least one resource parameter from a first resource parameter set. The first resource parameter set includes a plurality of resource parameters corresponding to a plurality of pieces of capability information and/or a plurality of device types.

The apparatus in this implementation may obtain the at least one resource parameter from the first resource parameter set based on the device type and/or the capability information of the first terminal device. The resource parameter obtaining manner is more flexible.

With reference to the fourth aspect, in a fourth possible implementation of the fourth aspect, the capability information of the first terminal device includes at least one of the following: identity information of the first terminal device, where the identity information indicates that the first terminal device has a resource allocation or scheduling capability; type information of a communication domain of the first terminal device; and priority information of the communication domain of the first terminal device, where the priority information of the communication domain indicates a priority of the communication domain of the first terminal device.

The apparatus in this implementation may select more applicable capability information according to a requirement of an actual application scenario, so that settings of the capability information are more flexible, and applicability is better.

With reference to the fourth aspect, in a fifth possible implementation of the fourth aspect, the at least one resource parameter includes at least one of the following: channel occupancy ratio information, modulation and coding scheme information, resource cycle information, and resource duration information.

The apparatus in this implementation may select a more applicable resource parameter according to a requirement of an actual application scenario, so that settings of the resource parameter are more flexible, and applicability is better.

With reference to the fourth aspect, in a sixth possible implementation of the fourth aspect, the sending module is further configured to send first resource indication information, and/or at least one of the capability information of the first terminal device and information about the device type of the first terminal device, where the first resource indication information indicates the first time-frequency resource.

The apparatus in this implementation may send, to the another terminal device, the first resource indication information indicating the first time-frequency resource, and/or the at least one of the capability information and the device type information of the first terminal device. In this way, the another terminal device may be notified of information about the time-frequency resource obtained by the first terminal device, to avoid a communication conflict between the another terminal device and the first terminal device.

According to a fifth aspect, this application provides a communications apparatus. The apparatus includes a receiving module and a processing module. The receiving module is configured to receive first resource configuration information from a second terminal device. The processing module is configured to obtain second resource configuration information corresponding to a first resource pool; and initiate a connection setup request to the second terminal device based on the first resource configuration information and the second resource configuration information, or disconnect a connection to the second terminal device based on the first resource configuration information and the second resource configuration information.

The communications apparatus in this implementation may receive the first resource configuration information sent by the second terminal device, obtain the second resource configuration information corresponding to the first resource pool, and initiate the connection setup request to the second terminal device based on the first resource configuration information and the second resource configuration information, or disconnect the connection to the second terminal device based on the first resource configuration information and the second resource configuration information. The apparatus is applied to short-range communications, for example, short-range communications in the autonomous driving field and the intelligent cockpit field. Each terminal device participating in the short-range communications may compare different resource configuration information, and choose whether to be scheduled or allocated a resource by another terminal device having a resource allocation capability, to obtain better or more time-frequency resources, so as to better meet a communication requirement of the apparatus or improve communication performance of the apparatus.

With reference to the fifth aspect, in a first possible implementation of the fifth aspect, the first resource configuration information includes at least one of first channel busy ratio information, first modulation and coding scheme information, and first resource quantity information; and the second resource configuration information includes at least one of second channel busy ratio information, second modulation and coding scheme information, and second resource quantity information.

The communications apparatus in this implementation may select more applicable first resource configuration information and second resource configuration information according to a requirement of an actual application scenario, so that settings of the first resource configuration information and second resource configuration information are more flexible, and applicability is better.

With reference to the fifth aspect, in a second possible implementation of the fifth aspect, the processing module is configured to, when a first channel load ratio indicated by the first channel busy ratio information is greater than or greater than or equal to a second channel load ratio indicated by the second channel busy ratio information; or when a difference between a first channel load ratio indicated by the first channel busy ratio information and a second channel load ratio indicated by the second channel busy ratio information is greater than or greater than or equal to a first threshold, disconnect the connection to the second terminal device.

The communications apparatus in this implementation may disconnect the connection to the second terminal device when determining, by comparing channel load ratios, that better or more time-frequency resources can be obtained from the first resource pool, to obtain better or more time-frequency resources.

With reference to the fifth aspect, in a third possible implementation of the fifth aspect, the processing module is configured to, when a resource quantity indicated by the first resource quantity information is less than or less than or equal to a resource quantity indicated by the second resource quantity information, disconnect the connection to the second terminal device.

The communications apparatus in this implementation may disconnect the connection to the second terminal device when determining, by comparing resource quantities, that better or more time-frequency resources can be obtained from the first resource pool, to obtain better or more time-frequency resources.

With reference to the fifth aspect, in a fourth possible implementation of the fifth aspect, the processing module is configured to, when a first modulation and coding scheme indicated by the first modulation and coding scheme information is less than a second modulation and coding scheme indicated by the second modulation and coding scheme information; or when a distance between a second modulation and coding scheme indicated by the second modulation and coding scheme information and a first modulation and coding scheme indicated by the first modulation and coding scheme information is greater than or greater than or equal to a second threshold, disconnect the connection to the second terminal device.

The communications apparatus in this implementation may disconnect the connection to the second terminal device when determining, by comparing modulation and coding schemes, that better or more time-frequency resources can be obtained from the first resource pool, to obtain better or more time-frequency resources.

With reference to the fifth aspect, in a fifth possible implementation of the fifth aspect, the processing module is configured to, when a first channel load ratio indicated by the first channel busy ratio information is less than a second channel load ratio indicated by the second channel busy ratio information; or when a difference between a second channel load ratio indicated by the second channel busy ratio information and a first channel load ratio indicated by the first channel busy ratio information is greater than or greater than or equal to a third threshold, initiate the connection setup request to the second terminal device.

The communications apparatus in this implementation may initiate the connection setup request to the second terminal device by comparing channel load ratios, and accept resource scheduling or allocation of the second terminal device, to obtain better or more time-frequency resources, so as to better meet a communication requirement of the communications apparatus or improve communication performance of the communications apparatus.

With reference to the fifth aspect, in a sixth possible implementation of the fifth aspect, the processing module is configured to, when a resource quantity indicated by the first resource quantity information is greater than a resource quantity indicated by the second resource quantity information, initiate the connection setup request to the second terminal device.

The communications apparatus in this implementation initiates the connection setup request to the second terminal device by comparing resource quantities, and accepts resource scheduling or allocation of the second terminal device, to obtain better or more time-frequency resources, so as to better meet a communication requirement of the communications apparatus or improve communication performance of the communications apparatus.

With reference to the fifth aspect, in a seventh possible implementation of the fifth aspect, the processing module is configured to, when a first modulation and coding scheme indicated by the first modulation and coding scheme information is greater than or greater than or equal to a second modulation and coding scheme indicated by the second modulation and coding scheme information; or when a distance between a first modulation and coding scheme indicated by the first modulation and coding scheme information and a second modulation and coding scheme indicated by the second modulation and coding scheme information is greater than or greater than or equal to a fourth threshold, initiate the connection setup request to the second terminal device.

The communications apparatus in this implementation may initiate the connection setup request to the second terminal device by comparing modulation and coding schemes, and accept resource scheduling or allocation of the second terminal device, to obtain better or more time-frequency resources, so as to better meet a communication requirement of the communications apparatus or improve communication performance of the communications apparatus.

With reference to the fifth aspect, in an eighth possible implementation of the fifth aspect, the second resource configuration information corresponding to the first resource pool is preconfigured.

According to the communications apparatus in this implementation, the second resource configuration information corresponding to the first resource pool is preconfigured, and can be obtained more easily and quickly during use.

With reference to the fifth aspect, in a ninth possible implementation of the fifth aspect, the processing module is configured to obtain the second resource configuration information that corresponds to the first resource pool and that is configured by the second terminal device by using signaling.

The communications apparatus in this implementation may obtain, from signaling sent by the second terminal device, the second resource configuration information corresponding to the first resource pool, so that the second resource configuration information can be obtained more flexibly.

With reference to the fifth aspect, in a tenth possible implementation of the fifth aspect, the first resource configuration information corresponds to a second resource pool; or the first resource configuration information is included in a first semi-persistent scheduling message.

The communications apparatus in this implementation may further obtain information about the second resource pool when obtaining the first resource configuration information. The second resource pool is a resource pool used by the second terminal device to schedule a time-frequency resource for another terminal device connected to the second terminal device, so that reference information for adjusting a status of the connection to the second terminal device is richer, and applicability is better.

According to a sixth aspect, this application provides a communications apparatus. The apparatus includes a receiving module and a processing module. The receiving module is configured to receive first resource configuration information from a second terminal device. The processing module is configured to obtain second resource configuration information corresponding to a first resource pool, where the first resource pool is allowed to be shared by at least one first terminal device; and initiate a connection setup request to the second terminal device based on the first resource configuration information and the second resource configuration information, or disconnect a connection to the second terminal device based on the first resource configuration information and the second resource configuration information.

The communications apparatus in this implementation may receive the first resource configuration information sent by the second terminal device, obtain the second resource configuration information corresponding to the first resource pool, and initiate the connection setup request to the second terminal device based on the first resource configuration information and the second resource configuration information, or disconnect the connection to the second terminal device based on the first resource configuration information and the second resource configuration information. The apparatus is applied to short-range communications, for example, short-range communications in the autonomous driving field and the intelligent cockpit field. Each terminal device participating in the short-range communications may compare different resource configuration information, and choose whether to be scheduled or allocated a resource by another terminal device having a resource allocation capability, to obtain better or more time-frequency resources, so as to better meet a communication requirement of the apparatus or improve communication performance of the apparatus.

According to a seventh aspect, an embodiment of this application provides a communications apparatus. The communications apparatus includes at least one processor, and when the at least one processor executes a computer program or instructions in at least one memory, the method according to the first aspect is performed.

According to an eighth aspect, an embodiment of this application provides a communications apparatus. The communications apparatus includes at least one processor, and when the at least one processor executes a computer program or instructions in at least one memory, the method according to the second aspect is performed.

According to a ninth aspect, an embodiment of this application provides a communications apparatus. The communications apparatus includes at least one processor, and when the at least one processor executes a computer program or instructions in at least one memory, the method according to the third aspect is performed.

According to a tenth aspect, an embodiment of this application provides a communications apparatus. The communications apparatus includes at least one processor and at least one memory. The at least one memory is configured to store a computer program or instructions; and the at least one processor is configured to execute the computer program or the instructions stored in the at least one memory, to enable the communications apparatus to perform the corresponding method according to the first aspect.

According to an eleventh aspect, an embodiment of this application provides a communications apparatus. The communications apparatus includes at least one processor and at least one memory. The at least one memory is configured to store a computer program or instructions; and the at least one processor is configured to execute the computer program or the instructions stored in the at least one memory, to enable the communications apparatus to perform the corresponding method according to the second aspect.

According to a twelfth aspect, an embodiment of this application provides a communications apparatus. The communications apparatus includes at least one processor and at least one memory. The at least one memory is configured to store a computer program or instructions; and the at least one processor is configured to execute the computer program or the instructions stored in the at least one memory, to enable the communications apparatus to perform the corresponding method according to the third aspect.

According to a thirteenth aspect, an embodiment of this application provides a communications apparatus. The communications apparatus includes at least one processor, at least one memory, and at least one transceiver. The at least one transceiver is configured to receive a signal or send a signal; the at least one memory is configured to store a computer program or instructions; and the at least one processor is configured to invoke the computer program or the instructions from the at least one memory, to perform the method according to the first aspect.

According to a fourteenth aspect, an embodiment of this application provides a communications apparatus. The communications apparatus includes at least one processor, at least one memory, and at least one transceiver. The at least one transceiver is configured to receive a signal or send a signal; the at least one memory is configured to store a computer program or instructions; and the at least one processor is configured to invoke the computer program or the instructions from the at least one memory, to perform the method according to the second aspect.

According to a fifteenth aspect, an embodiment of this application provides a communications apparatus. The communications apparatus includes at least one processor, at least one memory, and at least one transceiver. The at least one transceiver is configured to receive a signal or send a signal; the at least one memory is configured to store a computer program or instructions; and the at least one processor is configured to invoke the computer program or the instructions from the at least one memory, to perform the method according to the third aspect.

According to a sixteenth aspect, an embodiment of this application provides a communications apparatus. The communications apparatus includes at least one processor and at least one interface circuit. The at least one interface circuit is configured to receive a computer program or instructions, and transmit the computer program or the instructions to the at least one processor; and the at least one processor runs the computer program or the instructions to perform the corresponding method according to the first aspect.

According to a seventeenth aspect, an embodiment of this application provides a communications apparatus. The communications apparatus includes at least one processor and at least one interface circuit. The at least one interface circuit is configured to receive a computer program or instructions, and transmit the computer program or the instructions to the at least one processor; and the at least one processor runs the computer program or the instructions to perform the corresponding method according to the second aspect.

According to an eighteenth aspect, an embodiment of this application provides a communications apparatus. The communications apparatus includes at least one processor and at least one interface circuit. The at least one interface circuit is configured to receive a computer program or instructions, and transmit the computer program or the instructions to the at least one processor; and the at least one processor runs the computer program or the instructions to perform the corresponding method according to the third aspect.

According to a nineteenth aspect, an embodiment of this application provides a computer storage medium. The computer storage medium is configured to store a computer program or instructions, and when the computer program or the instructions is/are executed, the method according to the first aspect is implemented.

According to a twentieth aspect, an embodiment of this application provides a computer storage medium. The computer storage medium is configured to store a computer program or instructions, and when the computer program or the instructions is/are executed, the method according to the second aspect is implemented.

According to a twenty-first aspect, an embodiment of this application provides a computer storage medium. The computer storage medium is configured to store a computer program or instructions, and when the computer program or the instructions is/are executed, the method according to the third aspect is implemented.

According to a twenty-second aspect, an embodiment of this application provides a computer program product including a computer program or instructions. When the computer program or the instructions is/are executed, the method according to the first aspect is implemented.

According to a twenty-third aspect, an embodiment of this application provides a computer program product including a computer program or instructions. When the computer program or the instructions is/are executed, the method according to the second aspect is implemented.

According to a twenty-fourth aspect, an embodiment of this application provides a computer program product including a computer program or instructions. When the computer program or the instructions is/are executed, the method according to the third aspect is implemented.

According to a twenty-fifth aspect, an embodiment of this application provides a terminal device. The terminal device may be a transportation tool or an intelligent device, and include an uncrewed aerial vehicle, an unmanned transportation vehicle, an automobile, a robot, or the like. The transportation tool or the intelligent device includes the foregoing resource configuration apparatus and/or the foregoing communications apparatus.

This application provides a resource configuration method, a communication method, and an apparatus, to resolve the problem of how to perform resource configuration in a wireless communication mode to ensure efficient communication between terminal devices participating in short-range communications. In this method, the first terminal device may obtain the at least one resource parameter; then determine the first time-frequency resource based on the at least one resource parameter; and further send the at least one piece of resource configuration information to the at least one second terminal device. The at least one piece of resource configuration information may be used to configure the at least one second time-frequency resource that may be used for the at least one second terminal device, and the at least one second time-frequency resource belongs to the first time-frequency resource. It can be learned that the method is applied to the short-range communications, for example, the short-range communications in the autonomous driving field and the intelligent cockpit field. In terminal devices participating in the short-range communications, a terminal device having a resource allocation capability may obtain a time-frequency resource based on a resource parameter obtained by the terminal device, and allocate the time-frequency resource obtained by the terminal device to a terminal device connected to the terminal device. This ensures efficient communication between the terminal devices participating in the short-range communications.

DESCRIPTION OF EMBODIMENTS

Figure 1:
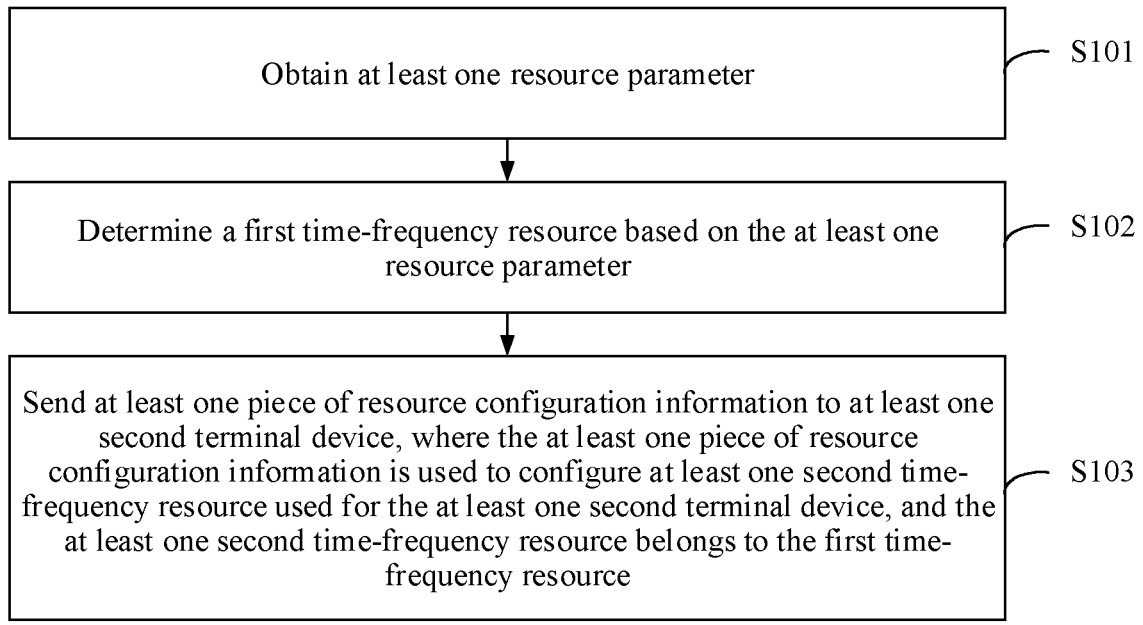
FIG. 1 is a schematic flowchart of an implementation of a resource configuration method according to this application.

The following describes the technical solutions of this application with reference to the accompanying drawings.

In descriptions of this application, unless otherwise specified, "/" means "or". For example, A/B may represent A or B. A term "and/or" in this specification describes only an association relationship between associated objects and represents that three relationships may exist. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words such as "example" or "for example" are used to represent giving an example, an illustration, or a description. Any embodiment or design scheme described as an "example" or "for example" in this application should not be explained as being more preferred or having more advantages than another embodiment or design scheme. Use of the word "example" or "for example" or the like is intended to present a related concept in a specific manner.

To facilitate understanding of the technical solutions in this application, the following describes technical terms in this application.

(1) Cockpit Domain Controller

The CDC is referred to as a head unit for short. Currently, the head unit may communicate with another in-vehicle device, to implement functions including but not limited to a conventional radio, music video playing, navigation broadcasting, and the like. In addition, the head unit may further have a cellular communication function, for example, a third-generation mobile communication technology (3rd-generation (3G)), a fourth-generation mobile communication technology (the 4th generation mobile communication technology (4G)), and a telematics function, to implement information communication between a person and a vehicle, and between a vehicle and the outside. This improves user experience and service, and enhances a security-related function.

(2) Master Node and Slave Node

The master node and the slave node are two types of nodes that are distinguished in logical functions. The master node manages the slave node, has a resource allocation capability or a resource scheduling capability, and is responsible for allocating a time-frequency resource to the slave node. The slave node follows the allocation of the master node, and performs communication by using the time-frequency resource allocated by the master node. It should be noted that attribute features of the master node and the slave node may change. For example, when an intelligent terminal communicates with a headset, the intelligent terminal is the master node, and the headset is the slave node. However, when the intelligent terminal accesses a device having a higher priority, for example, a CDC, and follows scheduling of the CDC, a role attribute of the intelligent terminal is switched to the slave node.

Two cases of time-frequency resource allocation exist. One case is that the master node sets up a connection to the slave node, and allocates or schedules a time-frequency resource to the slave node in a dynamic or semi-dynamic manner. The other case is that the master node sets up a connection to the slave node, the master node allocates only a resource pool to the slave node, and the slave node directly obtains a time-frequency resource from the resource pool to perform communication. The connection herein refers to a connection setup process between the slave node and the master node, and existence of the slave node is known to the master node.

(3) Isolated Node

The isolated node is a node that does not set up a connection to a master node, and directly obtains a time-frequency resource from a preconfigured resource pool or another resource pool (for example, a resource pool that is configured for the isolated node and that is included in a system broadcast message of the master node), to communicate with another terminal device. Usually, communication between isolated nodes is unknown to the master node.

(4) Communication Domain

The communication domain includes a master node and at least one slave node. The at least one slave node sets up a communication connection to the master node. The master node allocates or schedules a time-frequency resource to the at least one slave node. Each slave node communicates with the master node by using the scheduled or allocated time-frequency resource.

(5) Type of a Communication Domain

In an intelligent cockpit environment, a plurality of communication domains may exist. Different communication domains may have different node types, node capabilities, node attributes, and carried services. For example, a CDC may be used as a master node to schedule an in-vehicle audio and video device. In this case, the CDC is a master node, and the in-vehicle audio and video device is a slave node. The CDC and at least one in-vehicle audio and video device may form a communication domain, which is referred to as a CDC domain or a head unit domain. A mobile phone may be used as a master node, and schedule an intelligent wearable device. In this case, the intelligent wearable device is a slave node. The mobile phone and the intelligent wearable device may form a communication domain, which is referred to as a mobile phone domain. The CDC domain and mobile phone domain separately correspond to two different types of communication domains.

(6) Priority of a Communication Domain

Different communication domains may have different priorities. This ensures that a high-priority communication domain can obtain a time-frequency resource, so that service transmission of the communication domain is ensured. For example, compared with the mobile phone domain, the CDC domain mainly ensures an in-vehicle device service. In this case, the CDC domain may have a higher priority of a communication domain than that of the mobile phone domain.

(7) Time-Frequency Resource

The time-frequency resource is also referred to as a radio resource, that is, a radio physical layer resource for information transmission. Optionally, the time-frequency resource includes at least one time-domain symbol and at least one frequency domain subcarrier.

(8) Resource Pool

The resource pool is a resource set including at least one time-frequency resource. The at least one time-frequency resource included in the resource set may be consecutive or inconsecutive in time domain and/or frequency domain.

(9) Capability Information of a Terminal Device

The capability information of the terminal device represents a wireless communication capability of the terminal device. The wireless communication capability may include but is not limited to a resource allocation or scheduling capability, a multi-carrier capability, a multi-antenna capability, a supported coding/decoding scheme, a link modulation and coding scheme, and the like.

(10) Resource Parameter

A parameter used by a terminal device to select or obtain a radio resource is referred as the resource parameter. The terminal device, especially a master node, may obtain, based on the resource parameter, a radio resource/time-frequency resource available for allocation.

With reference to the foregoing technical terms, the following uses examples to describe application scenarios of the technical solutions provided in this application.

In short-range communications in the communications field, terminal devices may communicate with each other in a wired communication manner, or may communicate with each other in a wireless communication manner.

For example, in short-range communications in the autonomous driving field and the intelligent cockpit field, terminal devices participating in the short-range communications in an intelligent cockpit may include a head unit (CDC), an intelligent terminal (for example, a mobile phone) that can perform a communication connection to the head unit, an in-vehicle audio and video device (for example, a speaker, a microphone, or a screen), another intelligent wearable device (for example, a headset), and the like. Communication is performed in a wireless communication manner (for example, through a Bluetooth technology) between the head unit and the intelligent terminal and between the intelligent terminal and the intelligent wearable device, and communication is usually performed in a wired communication manner between the head unit and the in-vehicle audio and video device.

In the terminal devices participating in the short-range communications, when a quantity of terminal devices performing communication in a wired communication manner increases, a quantity of cables increases. This causes difficulty in cabling. For example, when a quantity of in-vehicle audio and video devices in the intelligent cockpit increases, a quantity of cables between the head unit and the in-vehicle audio and video devices increases. This causes difficulty in vehicle cabling.

For purposes of reducing the quantity of cables in the short-range communications and reducing the difficulty in cabling, this application proposes that all the terminal devices participating in the short-range communications communicate with each other in a wireless communication manner. For example, in the intelligent cockpit, communication is performed in a wireless communication manner between the intelligent terminal and the intelligent wearable device, between the intelligent terminal and the head unit, and between the in-vehicle audio and video device and the head unit. In this way, the difficulty in vehicle cabling can be solved.

In a wireless communication manner, terminal devices participating in short-range communications need to share a radio resource or a time-frequency resource. For example, the terminal devices in the intelligent cockpit need to share a radio resource or a time-frequency resource. In this case, from a perspective of a logical function, the terminal devices participating in the short-range communications usually include a master node and a slave node. The master node has a resource allocation capability, and may allocate or schedule a time-frequency resource to the slave node connected to the master node. The slave node does not have a resource scheduling capability, and communicates with the master node by using the time-frequency resource allocated or scheduled by the master node to the slave node, or by independently obtaining a part of a time-frequency resource from a configured time-frequency resource.

In addition, an isolated node may exist. The isolated node may independently obtain a time-frequency resource from a preconfigured resource pool or another resource pool, and communicate with another terminal device (for example, another isolated node).

Therefore, how to effectively configure a time-frequency resource to ensure efficient communication between the terminal devices participating in the short-range communications becomes a technical problem to be urgently resolved by persons skilled in the art.

To resolve the foregoing technical problem, embodiments of this application provide the following technical solutions. For specific content of the technical solutions, refer to the following descriptions.

It should be noted that terminal devices in this application may be static or mobile. The terminal device may be a device that includes a communications terminal, an in-vehicle device, a mobile device, a user terminal, a mobile terminal, a wireless communications device, a portable terminal, a user agent, a user apparatus, a service device, user equipment (UE), or the like, that is at the outermost periphery of a network in the computer network, and that is mainly configured to input data and output or display a processing result, or may be a software client, an application, or the like installed or running on any one of the foregoing devices. For example, the terminal device may be a mobile phone, a cordless phone, a smartwatch, a wearable device, a tablet device, a handheld device having a wireless communication function, a computing device, an in-vehicle communications module, a smart meter, or another processing device connected to a wireless modem.

The following describes the technical solutions provided in embodiments of this application in detail with reference to the accompanying drawings.

FIG. 1 is a schematic flowchart of an implementation of a resource configuration method according to this application. The method may be applied to a first terminal device, and may include the following steps.

Step S101: Obtain at least one resource parameter.

The first terminal device in this embodiment may be a master node and has a resource allocation capability. In addition, the first terminal device allocates a time-frequency resource in a resource pool to another terminal device in a communication domain of the first terminal device. For example, the first terminal device may be a head unit. The head unit may obtain a time-frequency resource from a resource pool, and allocate the time-frequency resource to another terminal device (for example, an in-vehicle audio and video device) in a head unit domain (CDC domain). Alternatively, the first terminal device may be an intelligent terminal, for example, a mobile phone. The mobile phone may obtain a time-frequency resource from a resource pool, and allocate the time-frequency resource to another terminal device (for example, an intelligent wearable device) in a mobile phone domain. Usually, the resource pool is a preconfigured or predefined resource pool. Optionally, the resource pool from which the first terminal device obtains the time-frequency resource may alternatively be a resource pool configured by another terminal device for the first terminal device.

Before obtaining the time-frequency resource from the resource pool, the first terminal device needs to first obtain or determine the at least one resource parameter. The at least one resource parameter represents an attribute requirement or a feature requirement for the time-frequency resource selected by the first terminal device from the resource pool. The first terminal device may obtain the time-frequency resource from the resource pool based on the at least one resource parameter, and allocate the time-frequency resource to another terminal device in the communication domain of the first terminal device.

For example, the at least one resource parameter may include at least one of the following: channel occupancy ratio information, modulation and coding scheme (MCS) information, resource cycle information, resource duration information, and the like.

The channel occupancy ratio information indicates a ratio of a resource quantity of the time-frequency resource obtained by the first terminal device to a total resource quantity of the resource pool to which the time-frequency resource belongs. In other words, the channel occupancy ratio information restricts a size of a time-frequency resource that can be obtained by the first terminal device. Optionally, the channel occupancy ratio information included in the at least one resource parameter may be maximum channel occupancy ratio information, and an actual size of the time-frequency resource obtained by the first terminal device may be less than or equal to a size of a time-frequency resource indicated by the maximum channel occupancy ratio information.

For example, assuming that the channel occupancy ratio information included in the at least one resource parameter is 0.1, it represents that a maximum ratio of the resource quantity of the time-frequency resource obtained by the first terminal device to the total resource quantity of the resource pool to which the time-frequency resource belongs is 0.1, and the first terminal device can obtain a maximum of only 10% of time-frequency resources in the resource pool.

For example, for a time division system, the channel occupancy ratio information may be a duty ratio.

It may be understood that the channel occupancy ratio information may be an index, an indication, or the like indicating or representing the ratio of the resource quantity of the time-frequency resource obtained by the first terminal device to the total resource quantity of the resource pool to which the time-frequency resource belongs. This is not limited in this application.

The modulation and coding scheme information indicates a modulation and coding scheme that is available when the first terminal device uses the obtained time-frequency resource. It may be understood that the modulation and coding scheme information included in the at least one resource parameter restricts a modulation and coding scheme used by the first terminal device to send data information to a second terminal device.

Optionally, the modulation and coding scheme information may indicate a specific modulation and coding scheme, or may indicate a modulation and coding range/modulation and coding scheme indication sequence including a minimum modulation and coding scheme and a maximum modulation and coding scheme. Optionally, the modulation and coding scheme information may alternatively include at least one of a minimum modulation and coding scheme and a maximum modulation and coding scheme.

For example, assuming that the modulation and coding scheme information included in the at least one resource parameter includes a minimum modulation and coding scheme index 001 and a maximum modulation and coding scheme index 010, where 001 indicates binary phase shift keying (BPSK), and 010 indicates quadrature phase shift keying (QPSK), the time-frequency resource selected by the first terminal device can use only BPSK modulation or QPSK modulation.

For another example, assuming that the modulation and coding scheme information included in the at least one resource parameter includes only the minimum modulation and coding scheme index 001, the time-frequency resource selected by the first terminal device can use only BP SK modulation.

For another example, assuming that the modulation and coding scheme information included in the at least one resource parameter includes a modulation and coding scheme indication sequence {001, 010}, the time-frequency resource selected by the first terminal device can use BPSK modulation or QPSK modulation.

Optionally, a modulation and coding scheme used by the first terminal device to send data information to the second terminal device (downlink) may be the same as or different from a modulation and coding scheme used by the second terminal device to send data information to the first terminal device (uplink).

The resource cycle information indicates a cycle in which the first terminal device is allowed to obtain a time-frequency resource. It may be understood that the time-frequency resource selected by the first terminal device may have a periodicity attribute. In this case, the resource cycle information restricts a cycle in which the first terminal device is allowed to obtain the time-frequency resource. For example, assuming that the resource cycle information indicates 1 to 10, the resource cycle information indicates that the first terminal device can obtain one or more of time-frequency resources having cycles of 100 ms, 200 ms, . . . , and 1000 ms. Assuming that the resource cycle information indicates 3 and 5, the resource cycle information indicates that the first terminal device can obtain a time-frequency resource whose cycle is 300 ms and/or 500 ms from a corresponding resource pool.

The resource duration information indicates duration of a life cycle for the first terminal device to obtain a time-frequency resource. After the first terminal device obtains the time-frequency resource, and the life cycle for obtaining a time-frequency resource this time ends, the first terminal device needs to reselect a time-frequency resource. For example, assuming that the resource duration information of the first terminal device is 1, a life cycle represented by the resource duration information is 10 seconds, and the first terminal device needs to reselect a time-frequency resource 10 seconds after obtaining the time-frequency resource this time.

It should be noted that the resource parameter in this embodiment may also be defined as a resource selection parameter, a resource selecting parameter, resource selection information, resource selecting information, or another name that can represent the attribute requirement or the feature requirement for the time-frequency resource selected by the first terminal device from the resource pool. This is not limited in this application.

There may be a plurality of implementations of obtaining the at least one resource parameter.

Optionally, the at least one resource parameter may be preconfigured in factory settings of the first terminal device. Based on this, the at least one resource parameter may be obtained in the following manner: obtaining the at least one preconfigured resource parameter based on the factory settings. In this manner, the first terminal device can quickly obtain the at least one resource parameter required by the first terminal device.

Optionally, the at least one resource parameter may alternatively be configured for the first terminal device by using another management device (for example, a roadside unit, a roadside base station, or a cloud platform). Based on this, the at least one resource parameter may alternatively be obtained in the following manner: receiving the at least one resource parameter sent by a management device by using a system message, a broadcast message, or other types of signaling. The at least one resource parameter is configured by the management device for the first terminal device. In this manner, the first terminal device can quickly obtain the at least one resource parameter required by the first terminal device. The system message or the broadcast message may be collectively referred to as a system broadcast message.

Optionally, a correspondence between capability information of a terminal device and a resource parameter may alternatively be preconfigured or predefined. Capability information of each terminal device may correspond to at least one resource parameter. For example, a first resource parameter set may be preconfigured or predefined, and the first resource parameter set includes a plurality of resource parameters corresponding to a plurality of pieces of capability information. Based on this, the at least one resource parameter may alternatively be obtained in the following manner: obtaining the at least one resource parameter from the first resource parameter set based on capability information of the first terminal device, where the at least one resource parameter corresponds to the capability information of the first terminal device.

Optionally, a correspondence between a device type of a terminal device and a resource parameter may be preconfigured or predefined in a system of the first terminal device. A device type of each terminal device may correspond to at least one resource parameter. For example, a first resource parameter set may be preconfigured or predefined, and the first resource parameter set includes a plurality of resource parameters corresponding to a plurality of device types. Based on this, the at least one resource parameter may alternatively be obtained in the following manner: obtaining the at least one resource parameter from the first resource parameter set based on a device type of the first terminal device, where the at least one resource parameter corresponds to the device type of the first terminal device.

Optionally, a correspondence between channel busy ratio information and a resource parameter may be preconfigured or predefined in a system of the first terminal device. Each piece of channel busy ratio information may correspond to at least one resource parameter. For example, a first resource parameter set may be preconfigured or predefined, and the first resource parameter set includes a plurality of resource parameters corresponding to a plurality of pieces of channel busy ratio information. Based on this, the at least one resource parameter may alternatively be obtained in the following manner: obtaining the at least one resource parameter from the first resource parameter set based on channel busy ratio information of the first terminal device, where the at least one resource parameter corresponds to the channel busy ratio information of the first terminal device. In this embodiment, the channel busy ratio information indicates a channel load ratio of a resource pool. Usually, when a channel load ratio of a resource pool indicated by the channel busy ratio information of the first terminal device is low, the first terminal device may select a large quantity of time-frequency resources. Optionally, the resource pool may be a resource pool from which the first terminal device selects a time-frequency resource.

Optionally, a correspondence between capability information and a device type of a terminal device and a resource parameter may be preconfigured or predefined in a system of the first terminal device. Capability information and a device type of each terminal device may correspond to at least one resource parameter. For example, a first resource parameter set may be preconfigured or predefined, and the first resource parameter set includes a plurality of resource parameters corresponding to a plurality of pieces of capability information and a plurality of device types. Based on this, the at least one resource parameter may alternatively be obtained in the following manner: obtaining the at least one resource parameter from the first resource parameter set based on capability information and a device type of the first terminal device, where the at least one resource parameter corresponds to the capability information and the device type of the first terminal device.

Optionally, a correspondence between capability information of a terminal device and a resource parameter may alternatively be configured or defined in a system of a management device (for example, a roadside unit, a roadside base station, or a cloud platform). Capability information of each terminal device may correspond to at least one resource parameter. For example, a first resource parameter set may be configured or defined in the system of the management device, and the first resource parameter set includes a plurality of resource parameters corresponding to a plurality of pieces of capability information.

Based on this, the at least one resource parameter may alternatively be obtained in the following manner: receiving the first resource parameter set sent by the management device by using a system broadcast message; and obtaining the at least one resource parameter from the first resource parameter set based on capability information of the first terminal device, where the at least one resource parameter corresponds to the capability information of the first terminal device.

Optionally, the at least one resource parameter may alternatively be obtained in the following manner: sending a request message to a management device, where the request message requests the management device to send a first resource parameter set to the first terminal device; receiving the first resource parameter set sent by the management device by using a response message; and obtaining the at least one resource parameter from the first resource parameter set based on capability information of the first terminal device, where the at least one resource parameter corresponds to the capability information of the first terminal device.

Optionally, a correspondence between a device type of a terminal device and a resource parameter may be configured or defined in a system of a management device. A device type of each terminal device may correspond to at least one resource parameter. For example, a first resource parameter set may be configured or defined in the system of the management device, and the first resource parameter set includes a plurality of resource parameters corresponding to a plurality of device types.

Based on this, the at least one resource parameter may alternatively be obtained in the following manner: receiving the first resource parameter set sent by the management device by using a system broadcast message; and obtaining the at least one resource parameter from the first resource parameter set based on a device type of the first terminal device, where the at least one resource parameter corresponds to the device type of the first terminal device.

Optionally, the at least one resource parameter may alternatively be obtained in the following manner: sending a request message to a management device, where the request message requests the management device to send a first resource parameter set to the first terminal device; receiving the first resource parameter set sent by the management device by using a response message; and obtaining the at least one resource parameter from the first resource parameter set based on a device type of the first terminal device, where the at least one resource parameter corresponds to the device type of the first terminal device.

Optionally, a correspondence between channel busy ratio information of a terminal device and a resource parameter may alternatively be configured or defined in a system of a management device (for example, a roadside unit, a roadside base station, or a cloud platform). Each piece of channel busy ratio information may correspond to at least one resource parameter. For example, a first resource parameter set may be configured or defined in the system of the management device, and the first resource parameter set includes a plurality of resource parameters corresponding to a plurality of pieces of channel busy ratio information.

Based on this, the at least one resource parameter may alternatively be obtained in the following manner: receiving the first resource parameter set sent by the management device by using a system broadcast message; and obtaining the at least one resource parameter from the first resource parameter set based on channel busy ratio information of the first terminal device, where the at least one resource parameter corresponds to the channel busy ratio information of the first terminal device.

Optionally, the at least one resource parameter may alternatively be obtained in the following manner: sending a request message to a management device, where the request message requests the management device to send a first resource parameter set to the first terminal device; receiving the first resource parameter set sent by the management device by using a response message; and obtaining the at least one resource parameter from the first resource parameter set based on channel busy ratio information of the first terminal device, where the at least one resource parameter corresponds to the channel busy ratio information of the first terminal device.

Optionally, a correspondence between capability information and a device type of a terminal device and a resource parameter may be configured or defined in a system of a management device. Capability information and a device type of each terminal device may correspond to at least one resource parameter. For example, a first resource parameter set may be configured or defined in the system of the management device, and the first resource parameter set includes a plurality of resource parameters corresponding to a plurality of pieces of capability information and a plurality of device types.

Based on this, the at least one resource parameter may alternatively be obtained in the following manner: receiving the first resource parameter set sent by the management device by using a system broadcast message; and obtaining the at least one resource parameter from the first resource parameter set based on capability information and a device type of the first terminal device, where the at least one resource parameter corresponds to the capability information and the device type of the first terminal device.

Optionally, the at least one resource parameter may alternatively be obtained in the following manner: sending a request message to a management device, where the request message requests the management device to send a first resource parameter set to the first terminal device; receiving the first resource parameter set sent by the management device by using a response message; and obtaining the at least one resource parameter from the first resource parameter set based on capability information and a device type of the first terminal device, where the at least one resource parameter corresponds to the capability information and the device type of the first terminal device.

It should be noted that, in a specific application scenario, content or types of communication in different communication domains is/are usually different, and attributes or features of time-frequency resources obtained from a preconfigured resource pool by terminal devices belonging to different communication domains are also different. In addition, in different application scenarios, attributes or features of time-frequency resources obtained by a first terminal device in a communication domain from a preconfigured resource pool are also different. Based on this, in any one of the foregoing implementations of obtaining the at least one resource parameter, setting of the at least one resource parameter is related to a specific application scenario and content or a type of communication. Optionally, a specific application scenario and content or a type of communication may be associated with the device type, the capability information, and/or the channel busy ratio information of the first terminal device.

In this embodiment, the capability information of the first terminal device indicates a priority of a time-frequency resource obtained by the first terminal device. To be specific, capability information of first terminal devices in different communication domains may be set based on specific application scenarios and content or types of communication, and the capability information indicates priorities of time-frequency resources obtained by the first terminal devices in the different communication domains. For example, the capability information of the first terminal device may include at least one of the following: identity information of the first terminal device; type information of a communication domain of the first terminal device; and priority information of the communication domain of the first terminal device.

The identity information of the first terminal device indicates that the first terminal device has a resource allocation or scheduling capability, and may indicate that the first terminal device has a resource allocation/scheduling capability or does not have a resource allocation/scheduling capability. In addition, the identity information of the first terminal device may indicate a priority of a time-frequency resource obtained by the first terminal device.

For example, the identity information of the first terminal device may be information indicating a type of a device (for example, a head unit, a mobile phone, or a portable terminal) having a resource allocation capability. In addition, a priority of a time-frequency resource obtained by the head unit is usually higher than a priority of a time-frequency resource obtained by the mobile phone by default, and the priority of the time-frequency resource obtained by the mobile phone is usually higher than a priority of a time-frequency resource obtained by the portable terminal by default. Alternatively, the identity information of the first terminal device may be an identity identifying that the first terminal device is a master node, and the identity may indicate the priority of the time-frequency resource obtained by the first terminal device.

For example, the identity information of the first terminal device may alternatively be indicated by using a device identifier. Usually, the device identifier is obtained by encoding the terminal device according to a specific encoding rule. Different fields in the device identifier have different meanings, and the identity information of the first terminal device may be obtained by parsing some or all fields.

For example, two bits may be used in the device identifier to indicate a device type, for example, 00 identifies a CDC, 01 identifies a mobile phone, and 10 identifies a wearable device. For another example, the identity information may alternatively be indicated by using one bit. For example, 0 identifies a master node (having a resource allocation/scheduling function), and 1 identifies a slave node (following scheduling of the master node).

For example, the identity information of the first terminal device may alternatively be indicated by using a media access control address (MAC address) or a physical address. This is similar to the device identifier, and details are not described herein again.

The type information of the communication domain of the first terminal device indicates a type of a communication domain to which the first terminal device belongs. For example, the type of the communication domain of the first terminal device may be a CDC domain, a mobile phone domain, or the like. Usually, a priority of a time-frequency resource obtained by the first terminal device in the CDC domain is higher than a priority of a time-frequency resource obtained by the first terminal device in the mobile phone domain by default.

The first terminal device may belong to the CDC domain, or may belong to the mobile phone domain. For example, the first terminal device is an intelligent terminal. When the intelligent terminal is scheduled by a CDC, the intelligent terminal belongs to the CDC domain. When the intelligent terminal is used as a master node to schedule an intelligent wearable device, a communication domain to which the intelligent terminal belongs is the mobile phone domain.

The priority information of the communication domain of the first terminal device indicates a priority of the communication domain to which the first terminal device belongs. For example, the CDC domain may have a highest priority, followed by the mobile phone domain. A terminal device having a high priority of a communication domain to which the terminal device belongs has a high priority in time-frequency resource allocation, and may occupy more or better time-frequency resources.

Step S102: Determine a first time-frequency resource based on the at least one resource parameter.

After obtaining the at least one resource parameter, the first terminal device may obtain the first time-frequency resource based on the at least one resource parameter. Further, optionally, a resource is allocated to the other terminal device in the communication domain of the first terminal device based on the obtained first time-frequency resource. The first time-frequency resource may be a time-frequency resource obtained by the first terminal device from the preconfigured resource pool based on the at least one resource parameter, or may be a time-frequency resource obtained by the first terminal device based on the at least one resource parameter from a resource pool configured by another terminal device for the first terminal device.

For example, when the at least one resource parameter obtained by the first terminal device is that the channel occupancy ratio information is 0.1, the resource quantity of the first time-frequency resource obtained based on the at least one resource parameter is one tenth of the total resource quantity of the resource pool to which the first time-frequency resource belongs.

Optionally, the first terminal device may determine the first time-frequency resource in a sensing-based resource selection manner. To be specific, the first terminal device senses the resource pool, measures power of each sub-channel in the resource pool, and selects a time-frequency resource having light load from the resource pool, that is, selects a time-frequency resource corresponding to a sub-channel having lowest power from all sub-channels, or selects a time-frequency resource corresponding to a sub-channel whose power is less than a power threshold. The power threshold may be a power threshold defined in a protocol.

Optionally, the first terminal device may alternatively determine the first time-frequency resource in a random-based resource selection manner. In other words, the first terminal device randomly selects the time-frequency resource from the resource pool.

Step S103: Send at least one piece of resource configuration information to at least one second terminal device, where the at least one piece of resource configuration information is used to configure at least one second time-frequency resource used for the at least one second terminal device, and the at least one second time-frequency resource belongs to the first time-frequency resource.

After obtaining the first time-frequency resource, the first terminal device may allocate the second time-frequency resource to the second terminal device in the communication domain of the first terminal device. The second time-frequency resource belongs to the first time-frequency resource. To be specific, the second time-frequency resource is a part of the first time-frequency resource. The second terminal device may communicate with the first terminal device by using the second time-frequency resource allocated by the first terminal device to the second terminal device.

For example, in the head unit domain, after obtaining the first time-frequency resource, the head unit serving as the first terminal device may select a second time-frequency resource from the first time-frequency resource and allocate the second time-frequency resource to the in-vehicle audio and video device in the head unit domain. The in-vehicle audio and video device may communicate with the head unit by using the second time-frequency resource allocated by the head unit. For another example, in the mobile phone domain, after obtaining the first time-frequency resource, the mobile phone serving as the first terminal device may select a second time-frequency resource from the first time-frequency resource and allocate the second time-frequency resource to the intelligent wearable device in the mobile phone domain. The intelligent wearable device may communicate with the mobile phone by using the second time-frequency resource allocated by the mobile phone. Usually, in the intelligent cockpit field, quality or a quantity of the first time-frequency resources obtained by the head unit is better than or greater than that of the first time-frequency resources obtained by the mobile phone.

The second terminal device in this embodiment may accept resource scheduling or allocation of the first terminal device, and may be a terminal device that has a resource allocation or scheduling capability, or may be a terminal device that does not have a resource allocation or scheduling capability. For example, the second terminal device may be the in-vehicle audio and video device, does not have a resource allocation or scheduling capability, and accepts resource scheduling or allocation of the head unit serving as the first terminal device. The mobile phone is a terminal device that has a resource allocation or scheduling capability. The mobile phone may be added to the head unit domain, and serves as the second terminal device to accept resource scheduling or allocation of the head unit.

The resource configuration information in this embodiment is also referred to as time-frequency resource configuration information or radio resource configuration information, and is information that is sent by the first terminal device to the second terminal device in this embodiment and that is used to configure a radio resource for the second terminal device. After receiving the resource configuration information, the second terminal device may obtain, by parsing the resource configuration information, the radio resource or the time-frequency resource configured for the second terminal device, that is, the second time-frequency resource.

Optionally, the resource configuration information may be included in a system broadcast message, for example, may be included in a master information block (MIB) of the system broadcast message, or may be included in a system information block (SIB) of the system broadcast message. The MIB is usually carried on a physical broadcast channel (PBCH), and the SIB is usually carried on Radio Resource Control (RRC) signaling. It may be understood that resource configuration may also be referred to as resource allocation or resource scheduling, and the resource configuration information may also be referred to as resource allocation information or resource scheduling information.

Optionally, the resource configuration information in this embodiment may also be carried on dedicated radio resource control RRC signaling.

In some optional embodiments of this application, the first terminal device may further send first resource indication information to another terminal device, where the first resource indication information indicates the first time-frequency resource; or may send at least one of the capability information of the first terminal device and information about the device type of the first terminal device to another terminal device; or may send first resource indication information and at least one of the capability information of the first terminal device and information about the device type of the first terminal device to another terminal device. In this way, the other terminal device may be notified of information about the time-frequency resource obtained by the first terminal device, to avoid a communication conflict between the another terminal device and the first terminal device.

In the resource configuration method provided in this embodiment of this application, the first terminal device first obtains the at least one resource parameter; then determines the first time-frequency resource based on the at least one resource parameter; and finally sends the at least one piece of resource configuration information to the at least one second terminal device. The at least one piece of resource configuration information is used to configure the at least one second time-frequency resource used for the at least one second terminal device, and the at least one second time-frequency resource belongs to the first time-frequency resource. It can be learned that the method is applied to the short-range communications, for example, the short-range communications in the autonomous driving field and the intelligent cockpit field. In terminal devices participating in the short-range communications, a terminal device having a resource allocation capability may obtain a time-frequency resource based on a resource parameter obtained by the terminal device, and allocate the time-frequency resource obtained by the terminal device to a terminal device connected to the terminal device, that is, allocate the time-frequency resource obtained by the terminal device to another terminal device in a communication domain of the terminal device. This ensures efficient communication between the terminal devices participating in the short-range communications.

Figure 2:
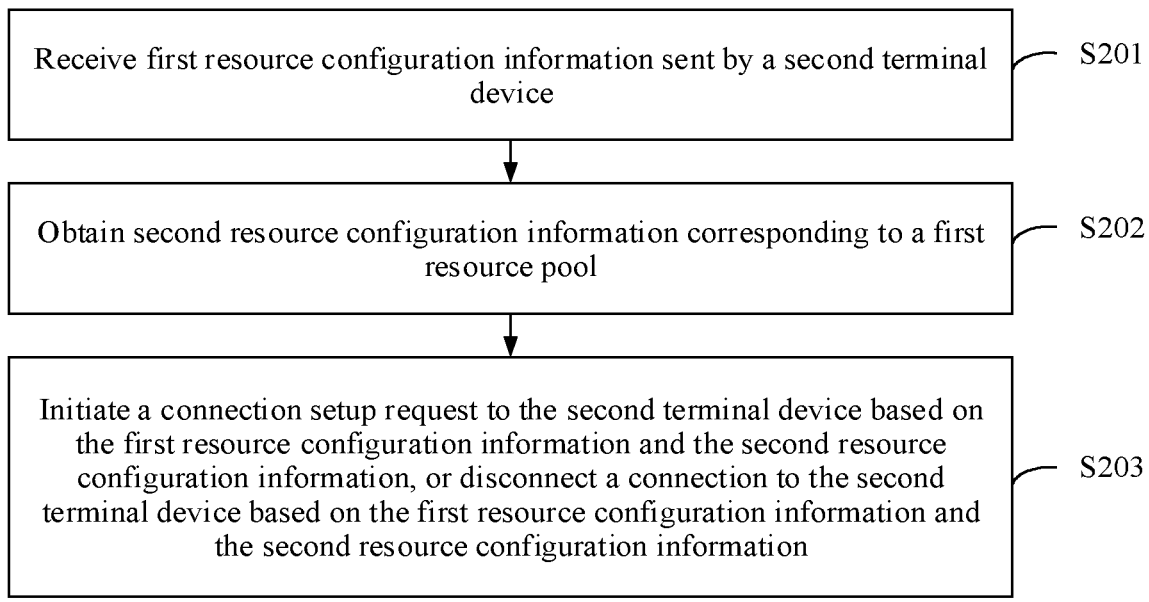
FIG. 2 is a schematic flowchart of an implementation of a communication method according to this application.

FIG. 2 is a schematic flowchart of an implementation of a communication method according to this application. The method may be applied to a first terminal device, and includes the following steps.

Step S201: Receive first resource configuration information sent by a second terminal device.

Herein, it should be noted that a meaning of the first terminal device in the embodiment shown in FIG. 2 is different from a meaning of the first terminal device in the embodiment shown in FIG. 1, and a meaning of the second terminal device in the embodiment shown in FIG. 2 is also different from a meaning of the second terminal device in the embodiment shown in FIG. 1.

In the embodiment shown in FIG. 1, the first terminal device may be a master node and has a resource allocation capability. For example, the first terminal device may be a head unit or a mobile phone in an intelligent cockpit. The second terminal device may accept resource scheduling or allocation of the first terminal device, and may be a terminal device that has a resource allocation or scheduling capability, or may be a terminal device that does not have a resource allocation or scheduling capability. The first terminal device and the second terminal device belong to a same communication domain.

In the embodiment shown in FIG. 2, the first terminal device is a terminal device on which resource scheduling or allocation may be performed. The first terminal device may set up a connection to the second terminal device, join a communication domain in which the second terminal device is located, and accept resource scheduling or allocation of the second terminal device; or may disconnect a connection to the second terminal device, and directly obtain a time-frequency resource from a first resource pool without joining the communication domain in which the second terminal device is located. For details, refer to content in subsequent embodiments. The second terminal device is a terminal device that has a resource scheduling or allocation capability.

For example, the first terminal device in the embodiment shown in FIG. 2 may be a mobile phone, and the second terminal device may be a head unit. The mobile phone may choose to join a head unit domain, and accept resource scheduling or allocation of the head unit; or may choose not to join a head unit domain, and directly obtain a time-frequency resource from a first resource pool.

In the embodiment shown in FIG. 2, for a purpose of ensuring communication performance of the communication domain in which the second terminal device is located, the second terminal device may divide a resource pool from which the second terminal device obtains a time-frequency resource into at least two resource pools, including a shared resource pool and a scheduling resource pool. The shared resource pool may be shared by a terminal device outside the communication domain in which the second terminal device is located. Usually, the second terminal device may send, by using a system broadcast message, information about the shared resource pool to the terminal device outside the communication domain of the second terminal device. In other words, the terminal device outside the communication domain in which the second terminal device is located may determine a resource by using the system broadcast message sent by the second terminal device. The scheduling resource pool is a dedicated resource pool of the communication domain in which the second terminal device is located, that is, the scheduling resource pool is exclusively used for communication in the communication domain in which the second terminal device is located, so that the communication performance of the communication domain in which the second terminal device is located can be ensured. A time-frequency resource allocated by the second terminal device to another terminal device in the communication domain in which the second terminal device is located is from the scheduling resource pool. However, the shared resource pool may be used by all terminal devices outside the communication domain in which the second terminal device is located, and communication performance usually cannot be ensured.

For example, the head unit and an in-vehicle audio and video device form the head unit domain, and the mobile phone and an intelligent wearable device form a mobile phone domain. For a purpose of ensuring communication performance of the head unit domain, the head unit may divide a resource pool from which the head unit obtains a time-frequency resource into a shared resource pool and a scheduling resource pool. The scheduling resource pool is specially used for communication of the head unit domain, and the head unit and the in-vehicle audio and video device communicate with each other by using a time-frequency resource in the scheduling resource pool. For communication between terminal devices that are not in the head unit domain, for example, the mobile phone and the intelligent wearable device, a time-frequency resource in the shared resource pool may be used. In addition, the shared resource pool may be shared by terminal devices other than the mobile phone and the intelligent wearable device outside the head unit domain.

It should be noted that the time-frequency resource in the shared resource pool and the time-frequency resource in the scheduling resource pool are usually completely orthogonal (not overlapping), or may overlap to some extent. This completely depends on an implementation, and is not limited in the present application.

The first resource configuration information sent by the second terminal device corresponds to a second resource pool, and the scheduling resource pool in the foregoing embodiment may be used as the second resource pool. A correspondence between the first resource configuration information and the second resource pool may be explicit or implicit. When sending the first resource configuration information to the first terminal device, the second terminal device may send only the first resource configuration information, or may send both information about the second resource pool and the first resource configuration information. The information about the second resource pool may be preconfigured for the second terminal device.

The first resource configuration information in this embodiment is used to configure a time-frequency resource for the first terminal device, or is used to represent an attribute of a time-frequency resource configured for the first terminal device, or is used to represent an attribute of a time-frequency resource that can be configured for the first terminal device. For example, the first resource configuration information may include at least one of first channel busy ratio information, first modulation and coding scheme information, and first resource quantity information.

The first channel busy ratio information indicates a status of a channel load ratio of the second resource pool, the channel load ratio is also referred to as a channel busy ratio (CBR), and the CBR describes a busy degree or a load degree of a time-frequency resource in the second resource pool. For example, the CBR may be a ratio of a quantity of sub-channels whose power exceeds a preset threshold in the second resource pool within a time period to a quantity of all sub-channels in the second resource pool. A smaller CBR indicates lighter load of the second resource pool. The time period and the preset threshold may be defined by a protocol.

Optionally, the first channel busy ratio information may be a channel load ratio. For example, the first channel busy ratio information may be that a channel load ratio is 20%, to indicate that a channel load ratio of the second resource pool is 20%. For another example, the first channel busy ratio information may be a channel load level indication. For example, channel load level indications are separately 1, 2, and 3, where 1 indicates a high channel load level, and a corresponding load ratio is greater than 50%; 2 indicates a medium channel load level, and a corresponding load ratio is [20%, 50%]; and 3 indicates a low channel load level, and a corresponding load ratio is less than 20%.

Optionally, the first channel busy ratio information may alternatively be obtained by the first terminal device by measuring the second resource pool.

For the first modulation and coding scheme information, refer to content in the foregoing embodiments. Details are not described herein again.

The first resource quantity information indicates a resource quantity of time-frequency resources scheduled or configured by the second terminal device for the first terminal device, or indicates a resource quantity of time-frequency resources that can be scheduled or configured by the second terminal device for the first terminal device. It may be understood that the first resource quantity information may indicate a resource quantity for a single time of scheduling, or may indicate a resource quantity for a plurality of times of scheduling. Optionally, the resource quantity for the single time of scheduling may be an average resource quantity or a maximum resource quantity for each time of scheduling. The first resource quantity information may be implicit. For example, the first terminal device may obtain the first resource quantity information through calculation or statistic collection by using the obtained time-frequency resource configured by the second terminal device for the first terminal device.

It may be understood that if the first terminal device chooses to join the communication domain in which the second terminal device is located, and accepts resource scheduling or allocation of the second terminal device, the second terminal device may schedule a time-frequency resource for the first terminal device in a dynamic scheduling manner or a semi-persistent scheduling manner. The dynamic scheduling manner means that the time-frequency resource scheduled by the second terminal device for the first terminal device may be a time-frequency resource scheduled for a single time of information sending. The semi-persistent scheduling manner means that the time-frequency resource scheduled by the second terminal device for the first terminal device may be a time-frequency resource that is transmitted periodically and that is scheduled for the first terminal device.

If the second terminal device schedules the time-frequency resource for the first terminal device in the dynamic scheduling manner, the second terminal device sends a dynamic scheduling message to the first terminal device, to notify the first terminal device that the time-frequency resource is scheduled for the first terminal device in the dynamic scheduling manner. If the second terminal device schedules the time-frequency resource for the first terminal device in the semi-persistent scheduling manner, the second terminal device sends a semi-persistent scheduling message to the first terminal device, to notify the first terminal device that the time-frequency resource is scheduled for the first terminal device in the semi-persistent scheduling manner.

When sending the semi-persistent scheduling message to the first terminal device, the second terminal device may include the first resource configuration information in this embodiment in the semi-persistent scheduling message. The semi-persistent scheduling message may be defined as a first semi-persistent scheduling message. Optionally, the first semi-persistent scheduling message may be carried on RRC signaling.

Optionally, the first resource configuration information in this embodiment may alternatively be included in a system message (system information), a broadcast message, or an RRC message sent by the second terminal device. For example, the first resource configuration information may be included in an MIB, or included in an SIB. The MIB is usually carried on a PBCH, and the SIB is usually carried on RRC signaling.

Optionally, the first resource configuration information in this embodiment may also be carried on dedicated RRC signaling.

Step S202: Obtain second resource configuration information corresponding to a first resource pool.

It can be learned from content in the foregoing embodiment that the second terminal device may divide the resource pool from which the second terminal device obtains the time-frequency resource into the shared resource pool and the scheduling resource pool. The shared resource pool may be shared by the terminal device outside the communication domain in which the second terminal device is located, and the scheduling resource pool is specially used for the communication in the communication domain in which the second terminal device is located.

When the first terminal device does not accept the resource scheduling or allocation of the second terminal device, the first terminal device may directly obtain a time-frequency resource from the first resource pool.

Optionally, the shared resource pool may be used as the first resource pool.

Optionally, a preconfigured resource pool may be used as the first resource pool, and the preconfigured resource pool may be preconfigured for the first terminal device.

Optionally, the first resource pool may further include a shared resource pool and a preconfigured resource pool. The preconfigured resource pool is different from the shared resource pool.

Optionally, in this embodiment, the second resource configuration information corresponding to the first resource pool may be included in a system broadcast message (system information) sent by the second terminal device, for example, may be included in an MIB of the system broadcast message, or may be included in a SIB of the system broadcast message. The MIB is usually carried on a PBCH, and the SIB is usually carried on RRC signaling.

Optionally, the second resource configuration information in this embodiment may also be carried on dedicated RRC signaling.

Optionally, the second resource configuration information in this embodiment may further be preconfigured for the first terminal device.

The second resource configuration information in this embodiment may include at least one of second channel busy ratio information, second modulation and coding scheme information, and second resource quantity information.

For the second channel busy ratio information and the second modulation and coding scheme information, refer to content in the foregoing embodiment. Details are not described herein again.

The second resource quantity information indicates a resource quantity of time-frequency resources that can be obtained by the first terminal device from the first resource pool. Optionally, the second resource quantity information may indicate a resource quantity for a single time of resource selection, or may indicate a resource quantity for a plurality of times of resource selection. Optionally, the resource quantity for the single time of resource selection may be an average resource quantity or a maximum resource quantity for each time of resource selection.

It may be understood that the first terminal device may obtain the time-frequency resource from the first resource pool in a random resource selection manner or in a resource selection manner based on a sensing resource selection mechanism.

There may be a plurality of implementations of obtaining the second resource configuration information corresponding to the first resource pool.

Optionally, the second resource configuration information corresponding to the first resource pool may be preconfigured in the first terminal device. Based on this, that the second resource configuration information corresponding to the first resource pool is obtained may be implemented in the following manner: obtaining the preconfigured second resource configuration information corresponding to the first resource pool.

Optionally, the second resource configuration information corresponding to the first resource pool may alternatively be preconfigured in the second terminal device. Based on this, that the second resource configuration information corresponding to the first resource pool is obtained may alternatively be implemented in the following manner: obtaining the second resource configuration information that corresponds to the first resource pool, and that is sent by the second terminal device by using the system broadcast message or that is configured by using the dedicated RRC signaling.

Step S203: Initiate a connection setup request to the second terminal device based on the first resource configuration information and the second resource configuration information, or disconnect a connection to the second terminal device based on the first resource configuration information and the second resource configuration information.

After obtaining the first resource configuration information and the second resource configuration information, the first terminal device may determine an attribute of a time-frequency resource in the first resource pool and an attribute of a time-frequency resource in the second resource pool based on the first resource configuration information and the second resource configuration information, to compare quality of the time-frequency resource in the first resource pool and quality of the time-frequency resource in the second resource pool. Further, the first terminal device determines whether to join the communication domain in which the second terminal device is located and be scheduled a time-frequency resource by the second terminal device, or chooses not to accept scheduling of the second terminal device and obtains a time-frequency resource from the first resource pool, to obtain better or more time-frequency resources, so as to better meet a communication requirement of the first terminal device or improve communication performance of the first terminal device.

Optionally, if a first channel load ratio indicated by the first channel busy ratio information is greater than or equal to a second channel load ratio indicated by the second channel busy ratio information; or if a difference between a first channel load ratio indicated by the first channel busy ratio information and a second channel load ratio indicated by the second channel busy ratio information is greater than or equal to a first threshold, the connection to the second terminal device is disconnected.

Optionally, if a resource quantity indicated by the first resource quantity information is less than or equal to a resource quantity indicated by the second resource quantity information, the connection to the second terminal device is disconnected.

Optionally, if a first modulation and coding scheme indicated by the first modulation and coding scheme information is less than a second modulation and coding scheme indicated by the second modulation and coding scheme information; or if a distance between a second modulation and coding scheme indicated by the second modulation and coding scheme information and a first modulation and coding scheme indicated by the first modulation and coding scheme information is greater than or equal to a second threshold, the connection to the second terminal device is disconnected.

For example, a modulation and coding scheme is usually represented by $2^N$. For example, BPSK is $2^1$, QPSK is $2^2$, and 64QAM may be represented by $2^6$. It may be understood that the QPSK is greater than the BPSK. Assuming that two modulation and coding schemes are separately $2^{N1}$ (the first modulation and coding scheme) and $2^{N2}$ (the second modulation and coding scheme), a distance between the first modulation and coding scheme and the second modulation and coding scheme is N1-N2.

Optionally, if a first channel load ratio indicated by the first channel busy ratio information is less than a second channel load ratio indicated by the second channel busy ratio information; or if a difference between a second channel load ratio indicated by the second channel busy ratio information and a first channel load ratio indicated by the first channel busy ratio information is greater than or equal to a third threshold, the connection setup request is initiated to the second terminal device.

Optionally, if a resource quantity indicated by the first resource quantity information is greater than a resource quantity indicated by the second resource quantity information, the connection setup request is initiated to the second terminal device.

Optionally, if a first modulation and coding scheme indicated by the first modulation and coding scheme information is greater than or equal to a second modulation and coding scheme indicated by the second modulation and coding scheme information; or if a distance between a first modulation and coding scheme indicated by the first modulation and coding scheme information and a second modulation and coding scheme indicated by the second modulation and coding scheme information is greater than or equal to a fourth threshold, the connection setup request is initiated to the second terminal device.

Optionally, if a first channel load ratio indicated by the first channel busy ratio information is greater than a second channel load ratio indicated by the second channel busy ratio information; or if a difference between a first channel load ratio indicated by the first channel busy ratio information and a second channel load ratio indicated by the second channel busy ratio information is greater than a first threshold, the connection to the second terminal device is disconnected.

Optionally, if a resource quantity indicated by the first resource quantity information is less than a resource quantity indicated by the second resource quantity information, the connection to the second terminal device is disconnected.

Optionally, if a first modulation and coding scheme indicated by the first modulation and coding scheme information is less than or equal to a second modulation and coding scheme indicated by the second modulation and coding scheme information; or if a distance between a second modulation and coding scheme indicated by the second modulation and coding scheme information and a first modulation and coding scheme indicated by the first modulation and coding scheme information is greater than a second threshold, the connection to the second terminal device is disconnected.

Optionally, if a first channel load ratio indicated by the first channel busy ratio information is less than or equal to a second channel load ratio indicated by the second channel busy ratio information; or if a difference between a second channel load ratio indicated by the second channel busy ratio information and a first channel load ratio indicated by the first channel busy ratio information is greater than a third threshold, the connection setup request is initiated to the second terminal device.

Optionally, if a resource quantity indicated by the first resource quantity information is greater than or equal to a resource quantity indicated by the second resource quantity information, the connection setup request is initiated to the second terminal device.

Optionally, if a first modulation and coding scheme indicated by the first modulation and coding scheme information is greater than a second modulation and coding scheme indicated by the second modulation and coding scheme information; or if a distance between a first modulation and coding scheme indicated by the first modulation and coding scheme information and a second modulation and coding scheme indicated by the second modulation and coding scheme information is greater than a fourth threshold, the connection setup request is initiated to the second terminal device.

Optionally, conditions corresponding to two pieces of parameter information or conditions corresponding to a plurality of pieces of parameter information for initiating the connection setup request to the second terminal device may be combined into one condition. Similarly, conditions corresponding to two pieces of parameter information or conditions corresponding to a plurality of pieces of parameter information for disconnecting the connection to the second terminal device may be combined into one condition. The following provides some examples.

Optionally, if a first channel load ratio indicated by the first channel busy ratio information is greater than or equal to a second channel load ratio indicated by the second channel busy ratio information, and a first modulation and coding scheme indicated by the first modulation and coding scheme information is less than a second modulation and coding scheme indicated by the second modulation and coding scheme information, the connection to the second terminal device is disconnected.

Optionally, if a first channel load ratio indicated by the first channel busy ratio information is less than a second channel load ratio indicated by the second channel busy ratio information, and a first modulation and coding scheme indicated by the first modulation and coding scheme information is greater than or equal to a second modulation and coding scheme indicated by the second modulation and coding scheme information, the connection setup request is initiated to the second terminal device.

In the communication method provided in this embodiment, the first terminal device may receive the first resource configuration information sent by the second terminal device, obtain the second resource configuration information corresponding to the first resource pool, and initiate the connection setup request to the second terminal device based on the first resource configuration information and the second resource configuration information, or disconnect the connection to the second terminal device based on the first resource configuration information and the second resource configuration information. Based on this, the method is applied to the short-range communications, for example, the short-range communications in the autonomous driving field and the intelligent cockpit field. Each terminal device participating in the short-range communications may compare different resource configuration information, and choose whether to be scheduled or allocated a resource by another terminal device having a resource allocation capability, to obtain better or more time-frequency resources, so as to better meet a communication requirement of the terminal device or improve communication performance of the terminal device.

The method embodiments described in this specification may be independent solutions, or may be combined based on internal logic. These solutions all fall within the protection scope of this application.

It may be understood that in the foregoing method embodiments, the methods and operations implemented by the terminal device may alternatively be implemented by a component (for example, a chip or a circuit) that can be used in the terminal device.

The foregoing mainly describes the solutions provided in embodiments of this application from a perspective of interaction between network elements. It may be understood that, to implement the foregoing functions, each of the network elements such as the first terminal device and the second terminal device includes a corresponding hardware structure and/or software module for performing each function. Persons skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

In embodiments of this application, the terminal device may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that division into the modules in the embodiments of this application is an example, and is merely logical function division. In an actual implementation, another division manner may be used. An example in which each function module is obtained through division based on each corresponding function is used below for description.

The methods provided in embodiments of this application are described above in detail with reference to FIG. 1 and FIG. 2. The apparatuses provided in embodiments of this application are described below in detail with reference to FIG. 3 to FIG. 5. It should be understood that descriptions of apparatus embodiments correspond to the descriptions of the method embodiments. Therefore, for content that is not described in detail, refer to the foregoing method embodiments. For brevity, details are not described herein again.

Figure 3:
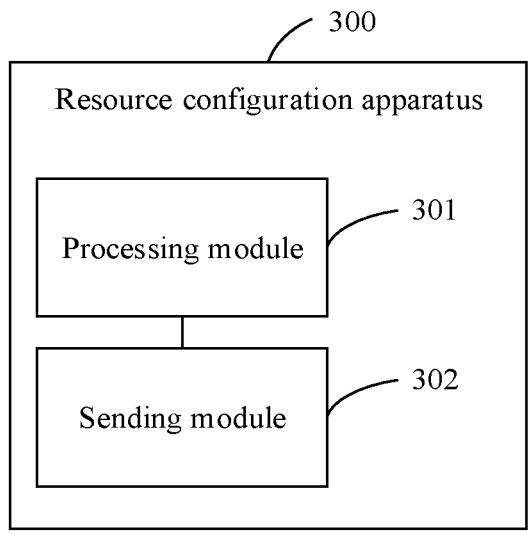
FIG. 3 is a block diagram of a structure of an implementation of a resource configuration apparatus according to this application.

FIG. 3 is a block diagram of a structure of an implementation of a resource configuration apparatus according to this application. The resource configuration apparatus may be a terminal device participating in short-range communications, for example, a terminal device such as a head unit or a mobile phone in short-range communications in the autonomous driving field and the intelligent cockpit field. Alternatively, the resource configuration apparatus may be a chip or an element in a terminal device participating in short-range communications. The resource configuration apparatus may alternatively be in another product form. The following describes the resource configuration apparatus from a perspective of a logical function with reference to FIG. 3.

As shown in FIG. 3, the resource configuration apparatus 300 may include a processing module 301 and a sending module 302. The resource configuration apparatus 300 may be configured to perform actions performed by the first terminal device in the method embodiment shown in FIG. 1.

For example, the processing module 301 may be configured to obtain at least one resource parameter; and determine a first time-frequency resource based on the at least one resource parameter. The sending module 302 may be configured to send at least one piece of resource configuration information to at least one second terminal device. The at least one piece of resource configuration information is used to configure at least one second time-frequency resource used for the at least one second terminal device, and the at least one second time-frequency resource belongs to the first time-frequency resource.

Optionally, the at least one resource parameter is preconfigured.

Optionally, the at least one resource parameter corresponds to capability information of a first terminal device, and/or the at least one resource parameter corresponds to a device type of the first terminal device.

Optionally, the processing module 301 is configured to obtain the at least one resource parameter from a first resource parameter set. The first resource parameter set includes a plurality of resource parameters corresponding to a plurality of pieces of capability information and/or a plurality of device types.

Optionally, the capability information of the first terminal device includes at least one of the following: identity information of the first terminal device, where the identity information indicates that the first terminal device has a time-frequency resource allocation or scheduling capability; type information of a communication domain of the first terminal device; and priority information of the communication domain of the first terminal device, where the priority information of the communication domain indicates a priority of the communication domain of the first terminal device.

Optionally, the at least one resource parameter includes at least one of the following: channel occupancy ratio information, modulation and coding scheme information, resource cycle information, and resource duration information.

Optionally, the sending module 302 is further configured to send first resource indication information, and/or at least one of the capability information of the first terminal device and information about the device type of the first terminal device. The first resource indication information indicates the first time-frequency resource.

In other words, the resource configuration apparatus 300 may implement steps or procedures performed by the first terminal device in the method shown in FIG. 1 according to embodiments of this application, and the resource configuration apparatus 300 may include modules configured to perform the method performed by the first terminal device in the method shown in FIG. 1. In addition, the modules in the resource configuration apparatus 300 and the foregoing other operations and/or functions are separately used to implement corresponding steps in the method shown in FIG. 1. For example, the processing module 301 in the resource configuration apparatus 300 may be configured to perform step S101 and step S102 in the method shown in FIG. 1, and the sending module 302 may be configured to perform step S103 in the method shown in FIG. 1.

It should be understood that, a specific process of performing the corresponding step by each module has been described in detail in the foregoing method embodiment. For brevity, details are not described herein again.

Figure 4:
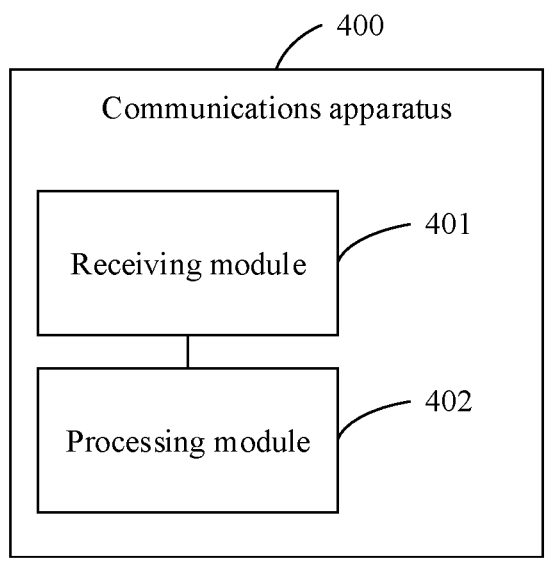
FIG. 4 is a block diagram of a structure of an implementation of a communications apparatus according to this application.

FIG. 4 is a block diagram of a structure of an implementation of a communications apparatus according to this application. The communications apparatus may be a terminal device participating in short-range communications, for example, a terminal device such as a mobile phone in short-range communications in the autonomous driving field and the intelligent cockpit field. Alternatively, the communications apparatus may be a chip or an element in a terminal device participating in short-range communications. The communications apparatus may alternatively be in another product form. The following describes the communications apparatus from a perspective of a logical function with reference to FIG. 4.

As shown in FIG. 4, the communications apparatus 400 may include a receiving module 401 and a processing module 402. The communications apparatus 400 may be configured to perform actions performed by the first terminal device in the method embodiment shown in FIG. 2.

For example, the receiving module 401 may be configured to receive first resource configuration information sent by a second terminal device. The processing module 402 may be configured to obtain second resource configuration information corresponding to a first resource pool; and initiate a connection setup request to the second terminal device based on the first resource configuration information and the second resource configuration information, or disconnect a connection to the second terminal device based on the first resource configuration information and the second resource configuration information.

Optionally, the first resource configuration information includes at least one of first channel busy ratio information, first modulation and coding scheme information, and first resource quantity information; and the second resource configuration information includes at least one of second channel busy ratio information, second modulation and coding scheme information, and second resource quantity information.

Optionally, the processing module 402 is configured to, if a first channel load ratio indicated by the first channel busy ratio information is greater than or equal to a second channel load ratio indicated by the second channel busy ratio information; or if a difference between a first channel load ratio indicated by the first channel busy ratio information and a second channel load ratio indicated by the second channel busy ratio information is greater than or equal to a first threshold, disconnect the connection to the second terminal device.

Optionally, the processing module 402 is configured to, if a resource quantity indicated by the first resource quantity information is less than or equal to a resource quantity indicated by the second resource quantity information, disconnect the connection to the second terminal device.

Optionally, the processing module 402 is configured to, if a first modulation and coding scheme indicated by the first modulation and coding scheme information is less than a second modulation and coding scheme indicated by the second modulation and coding scheme information; or if a distance between a second modulation and coding scheme indicated by the second modulation and coding scheme information and a first modulation and coding scheme indicated by the first modulation and coding scheme information is greater than or equal to a second threshold, disconnect the connection to the second terminal device.

Optionally, the processing module 402 is configured to, if a first channel load ratio indicated by the first channel busy ratio information is less than a second channel load ratio indicated by the second channel busy ratio information; or if a difference between a second channel load ratio indicated by the second channel busy ratio information and a first channel load ratio indicated by the first channel busy ratio information is greater than or equal to a third threshold, initiate the connection setup request to the second terminal device.

Optionally, the processing module 402 is configured to, if a resource quantity indicated by the first resource quantity information is greater than a resource quantity indicated by the second resource quantity information, initiate the connection setup request to the second terminal device.

Optionally, the processing module 402 is configured to, if a first modulation and coding scheme indicated by the first modulation and coding scheme information is greater than or equal to a second modulation and coding scheme indicated by the second modulation and coding scheme information; or if a distance between a first modulation and coding scheme indicated by the first modulation and coding scheme information and a second modulation and coding scheme indicated by the second modulation and coding scheme information is greater than or equal to a fourth threshold, initiate the connection setup request to the second terminal device.

Optionally, the processing module 402 is configured to, if a first channel load ratio indicated by the first channel busy ratio information is greater than a second channel load ratio indicated by the second channel busy ratio information; or if a difference between a first channel load ratio indicated by the first channel busy ratio information and a second channel load ratio indicated by the second channel busy ratio information is greater than a first threshold, disconnect the connection to the second terminal device.

Optionally, the processing module 402 is configured to, if a resource quantity indicated by the first resource quantity information is less than a resource quantity indicated by the second resource quantity information, disconnect the connection to the second terminal device.

Optionally, the processing module 402 is configured to, if a first modulation and coding scheme indicated by the first modulation and coding scheme information is less than or equal to a second modulation and coding scheme indicated by the second modulation and coding scheme information; or if a distance between a second modulation and coding scheme indicated by the second modulation and coding scheme information and a first modulation and coding scheme indicated by the first modulation and coding scheme information is greater than a second threshold, disconnect the connection to the second terminal device.

Optionally, the processing module 402 is configured to, if a first channel load ratio indicated by the first channel busy ratio information is less than or equal to a second channel load ratio indicated by the second channel busy ratio information; or if a difference between a second channel load ratio indicated by the second channel busy ratio information and a first channel load ratio indicated by the first channel busy ratio information is greater than a third threshold, initiate the connection setup request to the second terminal device.

Optionally, the processing module 402 is configured to, if a resource quantity indicated by the first resource quantity information is greater than or equal to a resource quantity indicated by the second resource quantity information, initiate the connection setup request to the second terminal device.

Optionally, the processing module 402 is configured to, if a first modulation and coding scheme indicated by the first modulation and coding scheme information is greater than a second modulation and coding scheme indicated by the second modulation and coding scheme information; or if a distance between a first modulation and coding scheme indicated by the first modulation and coding scheme information and a second modulation and coding scheme indicated by the second modulation and coding scheme information is greater than a fourth threshold, initiate the connection setup request to the second terminal device.

Optionally, the second resource configuration information corresponding to the first resource pool is preconfigured.

Optionally, the processing module 402 is configured to obtain the second resource configuration information that corresponds to the first resource pool and that is configured by the second terminal device by using signaling.

Optionally, the first resource configuration information corresponds to a second resource pool; or the first resource configuration information is included in a first semi-persistent scheduling message.

In other words, the communications apparatus 400 may implement steps or procedures performed by the first terminal device in the method shown in FIG. 2 according to embodiments of this application, and the communications apparatus 400 may include modules configured to perform the method performed by the first terminal device in the method shown in FIG. 2. In addition, the modules in the communications apparatus 400 and the foregoing other operations and/or functions are separately used to implement corresponding steps in the method shown in FIG. 2. For example, the receiving module 401 in the communications apparatus 400 may be configured to perform step S201 in the method shown in FIG. 2, and the processing module 402 may be configured to perform step S202 and step S203 in the method shown in FIG. 2.

It should be understood that, a specific process of performing the corresponding step by each module has been described in detail in the foregoing method embodiment. For brevity, details are not described herein again.

An embodiment of this application further provides a processing apparatus, including at least one processor and a communications interface. The communications interface is configured to provide information input and/or output for the at least one processor, and the at least one processor is configured to perform the methods in the foregoing method embodiments.

Figure 5:
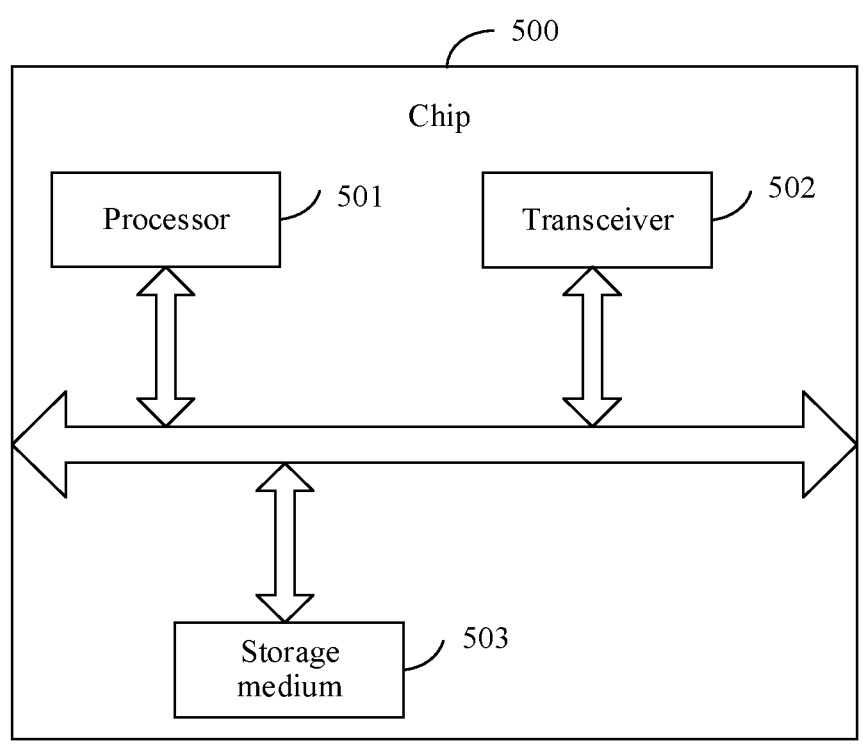
FIG. 5 is a block diagram of a structure of an implementation of a chip according to this application.

It should be understood that the processing apparatus may be a chip. For example, FIG. 5 is a block diagram of a structure of an implementation of a chip according to this application. The chip shown in FIG. 5 may be a general-purpose processor or a dedicated processor. The chip 500 includes at least one processor 501. The at least one processor 501 may be configured to support the apparatus shown in FIG. 3 in performing the technical solutions shown in FIG. 1, or configured to support the communications apparatus shown in FIG. 4 in performing the technical solutions shown in FIG. 2.

Optionally, the chip 500 may further include a transceiver 502. The transceiver 502 is configured to, under control of the processor 501, support the apparatus shown in FIG. 3 in performing the technical solutions shown in FIG. 1, or support the communications apparatus shown in FIG. 4 in performing the technical solutions shown in FIG. 2. Optionally, the chip shown in FIG. 5 may further include a storage medium 503. In an example, the transceiver may be replaced with a communications interface, and the communications interface provides information input and/or output for the at least one processor.

It should be noted that the chip shown in FIG. 5 may be implemented by using the following circuit or devices, such as, one or more of a field-programmable gate array (FPGA, a programmable logic device (PLD), an application-specific integrated circuit (ASIC), a system on a chip (SoC), a central processing unit (CPU), a network processor (NP), a digital signal processing circuit (DSP), a micro controller unit (MCU), a controller, a state machine, gate logic, a discrete hardware component, any other suitable circuit, or any combination of circuits that can perform various functions described in this application.

In an implementation process, steps in the foregoing methods can be implemented by using a hardware integrated logical circuit in the processor, or by using instructions in a form of software. The steps of the methods disclosed with reference to embodiments of this application may be directly performed by a hardware processor, or may be performed by a combination of hardware and a software module in the processor. The software module may be located in a mature storage medium in the art, such as a random-access memory (RAM), a flash memory, a read-only memory (ROM), a programmable read-only memory (PROM), an electrically erasable programmable memory (EEPROM), or a register. The storage medium is located in a memory, and the processor reads information in the memory and completes the steps in the foregoing methods in combination with the hardware in the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a DSP, an ASIC, an FPGA or another PLD, a discrete gate or a transistor logic device, or a discrete hardware component. It may implement or perform the methods, the steps, and the logical block diagrams that are disclosed in embodiments of this application. The general-purpose processor may be a microprocessor, or the processor may be any conventional processor or the like. The steps of the methods disclosed with reference to embodiments of this application may be directly performed by a hardware decoding processor, or may be performed by a combination of hardware and a software module in the decoding processor. The software module may be located in a mature storage medium in the art, such as a RAM, a flash memory, a ROM, a PROM, an EEPROM, or a register. The storage medium is located in a memory, and the processor reads information in the memory and completes the steps in the foregoing methods in combination with the hardware in the processor.

It may be understood that the memory in embodiments of this application may be a volatile memory or a nonvolatile memory, or may include both a volatile memory and a nonvolatile memory. The nonvolatile memory may be ROM, a PROM, an erasable programmable read-only memory (EPROM), an EEPROM, or a flash memory. The volatile memory may be a RAM and is used as an external cache. By way of example but not limitation, many forms of RAMs are available, for example, a static RAM (SRAM), a dynamic RAM (DRAM), a synchronous DRAM (SDRAM), a double data rate SDRAM (DDR SDRAM), an enhanced SDRAM (ESDRAM), a SynchLink DRAM (SLDRAM), and a direct Rambus RAM (DR RAM). It should be noted that the memories in the systems and methods described in this specification include but are not limited to these memories and any memory of another proper type.

According to the methods provided in embodiments of this application, an embodiment of this application further provides a computer program product. The computer program product includes a computer program or instructions. When the computer program or the instructions is/are run on a computer, the computer is enabled to perform the method according to any one of the embodiments shown in FIG. 1 or FIG. 2.

According to the methods provided in embodiments of this application, an embodiment of this application further provides a computer storage medium. The computer storage medium stores a computer program or instructions. When the computer program or the instructions is/are run on a computer, the computer is enabled to perform the method according to any one of the embodiments shown in FIG. 1 or FIG. 2.

According to the methods provided in embodiments of this application, an embodiment of this application further provides a communications system. The communications system may include one or more terminal devices, and each terminal device may be configured to perform the technical solutions shown in FIG. 1 or FIG. 2.

According to the methods provided in embodiments of this application, an embodiment of this application further provides a terminal device. The terminal device is a transportation tool or an intelligent device, and includes an uncrewed or unmanned aerial vehicle, an unmanned transportation vehicle, an automobile, a robot, or the like. The transportation tool or the intelligent device includes the foregoing resource configuration apparatus and/or the foregoing communications apparatus.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, the procedures or functions according to embodiments of this application are all or partially generated. The computer may be a general-purpose computer, a dedicated computer, a computer network, or another programmable apparatus. The computer programs or instructions may be stored in a computer-readable storage medium, or may be transmitted from a computer-readable storage medium to another computer-readable storage medium. For example, the computer programs or instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive or solid state disc (SSD)), or the like.

The terminal device in the foregoing apparatus embodiments corresponds to the terminal device in the method embodiments. A corresponding module or unit performs a corresponding step. For example, a communications module (a transceiver) performs a receiving step or a sending step in the method embodiments, and a processing module (a processor) may perform another step other than the sending step and the receiving step. For a function of a specific module, refer to the corresponding method embodiment. There may be one or more processors.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on a signal having one or more data packets (for example, data from two components interacting with another component in a local system, a distributed system, and/or across a network such as the Internet interacting with other systems by using the signal).

Persons of ordinary skill in the art may be aware that, in combination with illustrative logical blocks and steps described in embodiments disclosed in this specification may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that, for convenient and brief description, for a detailed working process of the foregoing system, apparatus, and module, refer to a corresponding process in the foregoing method embodiments. Details are not described herein again.

In the several embodiments provided in this application, it should be understood that the disclosed system, apparatuses, and methods may be implemented in other manners. For example, the described apparatus embodiments are merely examples. For example, division into modules is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The modules described as separate parts may or may not be physically separate, and parts displayed as modules may or may not be physical units, and may be located in one position, or may be distributed on a plurality of network units. Some or all of the units may be selected according to actual requirements to achieve the objectives of the solutions of embodiments.

In addition, function modules in embodiments of this application may be integrated into one processing unit, or each of the modules may exist alone physically, or two or more modules are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

The resource configuration apparatus, the communications apparatus, the communications system, the terminal device, the computer storage medium, the computer program product, and the chip provided in the foregoing embodiments of this application are configured to perform the methods provided above. Therefore, for beneficial effects that can be achieved by the resource configuration apparatus, the communications apparatus, the communications system, the computer storage medium, the computer program product, and the chip, refer to the beneficial effects corresponding to the methods provided above. Details are not described herein again.

It should be understood that, in embodiments of this application, an execution sequence of the steps should be determined based on functions and internal logic of the steps, and sequence numbers of the steps do not mean the execution sequence, and do not constitute a limitation on an implementation process of embodiments.

Embodiments in this specification are all described in a progressive manner, for same or similar parts in embodiments, refer to these embodiments, and each embodiment focuses on a difference from other embodiments. In an example, embodiments of the resource configuration apparatus, the communications apparatus, the communications system, the terminal device, the computer storage medium, the computer program product, and the chip are similar to the method embodiments, and therefore are described briefly. For related parts, refer to descriptions in the method embodiments.

Although some embodiments of this application have been described, persons skilled in the art can make changes and modifications to these embodiments once they learn the basic concept. Therefore, the following claims are intended to be construed as to cover the embodiments and all changes and modifications falling within the scope of this application.

The foregoing implementations of this application are not intended to limit the protection scope of this application.

What is claimed is:

1. A resource configuration method implemented by a first terminal device, wherein the resource configuration method comprises:
obtaining a resource parameter from a first resource parameter set, wherein the first resource parameter set comprises a plurality of resource parameters corresponding to at least one of a plurality of pieces of capability information of the first terminal device or a plurality of device types of the first terminal device, and wherein the resource parameter is preconfigured;
determining a first time-frequency resource based on the resource parameter; and
sending a piece of resource configuration information to at least one second terminal device,
wherein the piece of resource configuration information configures a second time-frequency resource that is used for the at least one second terminal device, and
wherein the second time-frequency resource belongs to the first time-frequency resource.

2. The resource configuration method of claim 1, wherein the resource parameter corresponds to capability information of the first terminal device, corresponds to a device type of the first terminal device, or corresponds to the capability information of the first terminal device and the device type of the first terminal device.

3. The resource configuration method of claim 2, wherein the capability information comprises at least one of:
identity information of the first terminal device, wherein the identity information indicates that the first terminal device has a resource allocation or scheduling capability;
type information of a communication domain of the first terminal device; or
priority information of the communication domain.

4. The resource configuration method of claim 1, wherein the resource parameter comprises at least one of a channel occupancy ratio information, modulation and coding scheme information, resource cycle information, or resource duration information.

5. The resource configuration method of claim 2, further comprising sending at least one of first resource indication information, the capability information of the first terminal device, or information about the device type of the first terminal device, wherein the first resource indication information indicates the first time-frequency resource.

6. A communication method implemented by a first terminal device, wherein the communication method comprises:
   receiving first resource configuration information from a second terminal device;
   obtaining second resource configuration information corresponding to a first resource pool, wherein the second resource configuration information is preconfigured; and
   initiating a connection setup request to the second terminal device based on the first resource configuration information and the second resource configuration information, or disconnecting a connection to the second terminal device based on the first resource configuration information and the second resource configuration information.

7. The communication method of claim 6, wherein the first resource configuration information comprises at least one of first channel busy ratio information, first modulation and coding scheme information, or first resource quantity information, and wherein the second resource configuration information comprises at least one of second channel busy ratio information, second modulation and coding scheme information, or second resource quantity information.

8. The communication method of claim 7, wherein disconnecting the connection to the second terminal device further comprises:
   disconnecting the connection to the second terminal device based on a determination that a first channel load ratio indicated by the first channel busy ratio information is greater than or greater than or equal to a second channel load ratio indicated by the second channel busy ratio information; or
   disconnecting the connection to the second terminal device based on a determination that a difference between a first channel load ratio indicated by the first channel busy ratio information and a second channel load ratio indicated by the second channel busy ratio information is greater than or greater than or equal to a first threshold.

9. The communication method of claim 7, wherein disconnecting the connection to the second terminal device further comprises disconnecting the connection to the second terminal device based on a determination that a resource quantity indicated by the first resource quantity information is less than or less than or equal to a resource quantity indicated by the second resource quantity information.

10. The communication method of claim 7, wherein disconnecting the connection to the second terminal device further comprises:
    disconnecting the connection to the second terminal device based on a determination that a first modulation and coding scheme indicated by the first modulation and coding scheme information is less than a second modulation and coding scheme indicated by the second modulation and coding scheme information; or
    disconnecting the connection to the second terminal device based on a determination that a distance between the second modulation and coding scheme and the first modulation and coding scheme is greater than or greater than or equal to a second threshold.

11. The communication method of claim 7, wherein initiating the connection setup request to the second terminal device further comprises:
    initiating the connection setup request to the second terminal device based on a determination that a first channel load ratio indicated by the first channel busy ratio information is less than a second channel load ratio indicated by the second channel busy ratio information; or
    initiating the connection setup request to the second terminal device a difference between the second channel load ratio and the first channel load ratio is greater than or greater than or equal to a third threshold.

12. The communication method of claim 7, wherein initiating the connection setup request to the second terminal device further comprises initiating the connection setup request to the second terminal device based on a determination that a resource quantity indicated by the first resource quantity information is greater than a resource quantity indicated by the second resource quantity information.

13. The communication method of claim 7, wherein initiating the connection setup request to the second terminal device further comprises:
    initiating the connection setup request to the second terminal device based on a determination that a first modulation and coding scheme indicated by the first modulation and coding scheme information is greater than or equal to a second modulation and coding scheme indicated by the second modulation and coding scheme information; or
    initiating the connection setup request to the second terminal device based on a determination that a distance between the first modulation and coding scheme and the second modulation and coding scheme is greater than or greater than or equal to a fourth threshold.

14. The communication method of claim 6, wherein obtaining the second resource configuration information further comprises obtaining the second resource configuration information that is based on signaling.

15. The communication method of claim 6, wherein the first resource configuration information corresponds to a second resource pool or is comprised in a first semi-persistent scheduling message.

16. A resource configuration apparatus, comprising:
    at least one processor; and
    a non-transitory computer-readable storage medium in communication with the at least one processor and configured to store program instructions that, when executed by the at least one processor, cause the resource configuration apparatus to:
        obtain a resource parameter, from a first resource parameter set, wherein the first resource parameter set comprises a plurality of resource parameters corresponding to at least one of a plurality of pieces of capability information of the resource configuration apparatus or a plurality of device types of the resource configuration apparatus, and wherein the resource parameter is preconfigured;
        determine a first time-frequency resource based on the resource parameter; and
        send a piece of resource configuration information to at least one second terminal device, wherein the piece of resource configuration information configures a second time-frequency resource that is used for the at least one second terminal device, and wherein the second time-frequency resource belongs to the first time-frequency resource.

17. The resource configuration apparatus of claim 16, wherein the resource parameter corresponds to capability information of the resource configuration apparatus, corresponds to a device type of the resource configuration apparatus, or corresponds to the capability information of the resource configuration apparatus and the device type of the resource configuration apparatus.

18. The resource configuration apparatus of claim 17, wherein the capability information comprises at least one of:
   identity information of the resource configuration apparatus, wherein the identity information indicates that the resource configuration apparatus has a resource allocation or scheduling capability;
   type information of a communication domain of the resource configuration apparatus; or
   priority information of the communication domain.

19. The resource configuration apparatus of claim 17, wherein the program instructions, when executed by the at least one processor, further cause the resource configuration apparatus to be configured to send at least one of first resource indication information, the capability information of the resource configuration apparatus, or information about the device type of the resource configuration apparatus, wherein the first resource indication information indicates the first time-frequency resource.

20. The resource configuration apparatus of claim 16, wherein the resource parameter comprises at least one of a channel occupancy ratio information, modulation and coding scheme information, resource cycle information, or resource duration information.

* * * * *